US008438282B2

(12) United States Patent
Miyakawa

(10) Patent No.: US 8,438,282 B2
(45) Date of Patent: May 7, 2013

(54) INFORMATION PROCESSING SYSTEM AND LOAD SHARING METHOD

(75) Inventor: Shinya Miyakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 432 days.

(21) Appl. No.: 12/308,275

(22) PCT Filed: Jun. 13, 2007

(86) PCT No.: PCT/JP2007/061878

§ 371 (c)(1), (2), (4) Date: Dec. 11, 2008

(87) PCT Pub. No.: WO2007/145238

PCT Pub. Date: Dec. 21, 2007

(65) Prior Publication Data

US 2010/0169456 A1 Jul. 1, 2010

(30) Foreign Application Priority Data

Jun. 16, 2006 (JP) ................................ 2006-166962

(51) Int. Cl.
*G06F 15/173* (2006.01)
*G06F 15/16* (2006.01)

(52) U.S. Cl.
USPC ........................................... 709/226; 709/202

(58) Field of Classification Search ................. 709/219, 709/202, 226, 229
See application file for complete search history.

(56) References Cited

U.S. PATENT DOCUMENTS 5,025,369 A 6/1991 Schwartz
5,892,945 A 4/1999 Mirchandaney et al.

(Continued)

FOREIGN PATENT DOCUMENTS

EP 1 732 004 A1 12/2006
JP 2000-242614 A 9/2000

(Continued)

OTHER PUBLICATIONS

Tiago Ferreto et al., Scheduling Divisible Workloads Using the Adaptive Time Factoring Algorithm, Distributed and Parallel Computing Lecture Notes in Computer Science, LNCS, 2005, pp. 232-239.

(Continued)

*Primary Examiner* — Patrice Winder
*Assistant Examiner* — Ebrahim Golabbakhsh
(74) *Attorney, Agent, or Firm* — Foley & Lardner LLP

(57) ABSTRACT

In an information processing system in which processing to be performed on a plurality of processed devices is shared and executed by a plurality of processing devices, load sharing is performed in units smaller than a processing request unit created. A request storing section of a main device stores a processing request including description of a plurality of devices to be processed which are processing objects and description of a processing content to be performed thereon. If the work load of an unexecuted processing request read out from the request storing section is heavy, a request dividing unit of each sub device divides the unexecuted processing request into a processing request including description of processed devices of the number commensurate with the processing by a processing unit and description of a processing content to be performed thereon, and a processing request including description of the remaining processed devices and description of a processing content to be performed thereon, and causes the processing unit to process the former processing request.

17 Claims, 21 Drawing Sheets

U.S. PATENT DOCUMENTS

| | | | | |
|---|---|---|---|---|
| 7,031,944 | B2 | 4/2006 | Tanioka | |
| 7,093,004 | B2 | 8/2006 | Bernardin et al. | |
| 2001/0047401 | A1 * | 11/2001 | McTernan et al. | 709/219 |
| 2001/0047422 | A1 * | 11/2001 | McTernan et al. | 709/231 |
| 2002/0040400 | A1 * | 4/2002 | Masters | 709/228 |
| 2002/0042823 | A1 * | 4/2002 | DeBettencourt et al. | 709/224 |
| 2002/0133536 | A1 * | 9/2002 | Ramachandran | 709/201 |
| 2003/0120709 | A1 * | 6/2003 | Pulsipher et al. | 709/106 |
| 2003/0126200 | A1 * | 7/2003 | Wolff | 709/203 |
| 2003/0191795 | A1 | 10/2003 | Bernardin et al. | |
| 2005/0114354 | A1 * | 5/2005 | Singh et al. | 707/10 |
| 2005/0182668 | A1 * | 8/2005 | Debber | 705/4 |
| 2005/0188087 | A1 | 8/2005 | Iyoda | |
| 2006/0020710 | A1 * | 1/2006 | Rabenold et al. | 709/236 |
| 2006/0041614 | A1 * | 2/2006 | Oe | 709/203 |
| 2007/0083498 | A1 * | 4/2007 | Byrne et al. | 707/3 |
| 2009/0145962 | A1 * | 6/2009 | Ramachandran | 235/379 |
| 2009/0327707 | A1 * | 12/2009 | Calvez et al. | 713/157 |

FOREIGN PATENT DOCUMENTS

| | | | |
|---|---|---|---|
| JP | 2001-344199 | A | 12/2001 |
| JP | 2002-358293 | A | 12/2002 |
| JP | 2004-062686 | A | 2/2004 |
| WO | WO 90/02378 | A1 | 3/1990 |
| WO | WO 2005/091137 | A1 | 9/2005 |

OTHER PUBLICATIONS

James S. Albus; Task Decomposition, Proceedings of the 1993 International Symposium on Intelligent Control, Aug. 1993, pp. 49-51.

R. H. Halstead, Jr., “Multilisp: A Language for Concurrent Symbolic Computation,” ACM Transactions on Programming Languages and Systems, vol. 7:4, Oct. 1985, pp. 501-538.

* cited by examiner

INFORMATION PROCESSING SYSTEM AND LOAD SHARING METHOD

This application is the National Phase of PCT/JP2007/061878, filed Jun. 13, 2007, which claims priority to Japanese Application No. 2006-166962, filed Jun. 16, 2006, the disclosures of which are hereby incorporated by reference in their entirety.

TECHNICAL FIELD

The present invention relates to an information processing system for sharing and performing processing on a plurality of processed devices by a plurality of information processing devices.

BACKGROUND ART

In an information processing system for performing processing such as distribution of an application program to processed devices such as web servers, as the number of processed devices increases, it takes longer time to complete the processing to all processed devices. In order to solve this problem, an effective technique is disclosed in Non-Patent Document 1.

The system described in Non-Patent Document 1 includes a plurality of processing devices which perform processing and a queue in which a plurality of processing requests are accumulated. The plurality of processing requests accumulated in the queue are distributed to respective processing devices and executed in parallel, in order to reduce the processing time and to share the load. With this technique, in the case of distributing the same application program to one-hundred web servers by using ten processing devices for example, if one-hundred processing requests which request distribution of an application program to one-hundred web servers are accumulated in the queue, and the one-hundred processing requests are allocated to the respective processing devices by ten requests for each and executed, the time required for the distribution becomes one tenth, compared with the case of distributing the application program by one processing device. Although the processing requests are equally allocated to the respective processing device in this example, it is possible to adjust the load by allocating more of the processing requests to a processing device of high performance than a processing device of low performance.

Non-Patent Document 1: Robert H. Halstead, Jr., "MULTILISP: a language for concurrent symbolic computation", ACM Transactions on Programming Languages and Systems (TOPLAS), 1985

Problems to be Solved by the Invention

However, as the load sharing is performed in processing request units in the above-described related art, finely-tuned load sharing can be realized only when one processed device is processed for one processing request. As such, as the number of processed devices becomes enormous, there is a problem that the number of processing requests to be created also becomes enormous.

In contrast, when increasing the number of processed devices to be processed in one processing request in order to reduce the number of processing requests to be created, although no problem is caused in processing devices of high performance, the load becomes heavy in processing devices of low performance so that a delay is caused in the processing.

The present invention has been conceived of in view of these circumstances, and an object of the present invention is to provide an information processing system enabling load sharing to be performed in units smaller than the created processing request unit.

Means for Solving the Problems

A first information processing system of the present invention includes a request storing section which stores a processing request including description of a plurality of processed devices which are processing objects and description of a processing content to be performed thereon, a plurality of processing units which share and execute the processing request, and a request dividing unit which divides the processing request stored in the request storing section into processing requests, one of which includes description of processed devices of the number commensurate with the processing capacity of the processing unit and description of a processing content to be performed thereon.

[Action]

In the present invention, a processing request including description of a plurality of processed devices which are processing objects and description of a processing content to be performed thereon is divided into processing requests, one of which includes description of processed devices of the number commensurate with the processing capacity of the processing unit and description of a processing content to be performed thereon, whereby load sharing is realized in units smaller than the created processing request unit. Division of the processing request may be performed on each sub device side having a processing unit, or on the main device side having the request storing section for storing the processing request. Further, selection of description of the processing devices of the number commensurate with the processing capacity of the processing unit may be performed by referring to information such as network bands and delay between respective sub devices and respective processed devices.

Effects of the Invention

According to the present invention, load sharing can be performed in units smaller than the processing request unit created by the system manager. This is because a processing request including description of a plurality of processed devices which are processing objects and description of a processing content to be performed thereon is divided into processing requests, one of which includes description of processed devices of the number commensurate with the processing capacity of the processing unit and description of a processing content to be performed thereon.

Further, according to the present invention, as the number of processed devices to be processed in one processing request is not necessarily one device, the load placed on the system manager who creates processing requests can be reduced.

BEST MODE FOR CARRYING OUT THE INVENTION

[First Exemplary Embodiment]

Referring to FIG. 1, an information processing system according to a first exemplary embodiment of the invention includes a plurality of sub devices 1000, and a main device 100 connected in a communicable manner with the plurality of sub devices 1000. Further, the respective sub devices 1000 are connected with a plurality of processed devices 2000 over a network 3000.

The main device 100 is a computer which stores and manages processing requests describing processing to be performed with respect to the processed devices 2000, and has a storage device 110 and a data processing device 120.

The storage device 110 is configured of a hard disk device and the like, and has a request storing section 111 which stores one or more processing requests. The respective processing requests stored in the request storing section 111 include description of the processed devices 2000 which are processing objects and description of a processing content to be performed thereon. As description of the processed devices 2000, character strings that the object processed devices 2000 can be uniquely identified such as IP addresses are used. Description of the processing content is one defining the content of processing to be performed on the processed devices 200, such as distribution of an application program.

The data processing device 120 is configured of a CPU of a computer and the like, and has a request management unit 121 which manages input and output of processing requests to the request storing section 111. The request management unit 121 and the request storing section 111 may be realized by commercially available database programs, for example.

Each of the sub devices 1000 is a computer which shares and performs processing to be performed on the processed devices 2000, and includes an input device 1010, a data processing device 1020, an output device 1030, and a storage device 1040.

The input device 1010 is configured of a keyboard or the like, and is used by a user to input various types of data into the sub device 1000. Further, in the exemplary embodiment, a processing request input from the input device 1010 is transmitted to the request management unit 121 of the main device 100 and is stored in the request storing section 111.

The output device 1030 is configured of a display device, a printing device, and the like, and is used for presenting various types of data to the user. Further, in the exemplary embodiment, a processing result read out from the request storing section 111 via the request management unit 121 of the main device 100 may be output from the output device 1030.

The data processing device 1020 is configured of a CPU of a computer or the like, and has a request dividing unit 1021 and a processing unit 1022.

The processing unit 1022 is a unit for performing processing requested by the request dividing unit 1021 on the processed devices 2000.

The request dividing unit 1021 is a unit for reading a processing request from the request storing section 111 of the main device 100 via the request management unit 121 and causing the processing unit 1022 to process. If the number of the processing object devices (the number of processed devices 2000) contained in a processing request exceeds the number of the processed devices capable of being processed which is determined by the processing capacity of the processing unit 1022, the request dividing unit 1021 divides the processing request. Specifically, an unexecuted processing request is divided into a processing request including description of one or more processed devices to be processed by the processing unit 1022 and description of a processing content to be processed thereon, and a processing request including description of the remaining processing devices and description of a processing content to be performed thereon.

The storage device 1040 is configured of a hard disk or the like, and has a performance storing section 1041 which stores performance information of the processing unit 1022. Performance information to be stored in the performance storing section 1041 may be static performance information such as a clock frequency of the CPU configuring the data processing device 1020 or information indicating loaded state such as CPU utilization and available memory at that time. Alternatively, the information may be the number of processed devices which can be processed at one time.

The processed device 2000 is a computer which is to be a processing object such as a web server.

The network 3000 may be a LAN configured of the Ethernet (registered trademark) or the Internet. Although the respective sub devices 1000 and the processed devices 2000 are connected over the network 3000 in FIG. 1, the respective sub devices 1000 and the main device 100 may also be connected over the network 3000.

Next, operation of the exemplary embodiment will be described.

1) Registration of Processing Request

In the case of performing any processing on processed devices 2000, a system manager inputs a processing request from the input device 1010 of any sub device 1000 (step S101 in FIG. 2). The processing request to be input includes description of all of the object processed devices 2000 and description of the processing content to be performed thereon. There is no need to create a processing request for each of the processed devices as described in the related art. However, the description of all of the object processed devices is not necessarily written in one processing request, and may be written in some processing requests, of course.

The processing request input from the input device 1010 of the sub device 1000 is stored in the request storing section 111 via the request management unit 121 of the main device 100 (step S102).

2) Processing of Processing Request

The request dividing unit 1021 of the data processing device 1020 of each sub device 1000 periodically searches for whether there is an unexecuted processing request in the request storing section 111 of the main device 100 (step S111 in FIG. 3). If no unexecuted processing request is found (NO in step S112), the request dividing unit 1021 waits for a certain time (step S113), and then returns to the step S111 and performs searching again.

If an unexecuted processing request is found (YES in step S112), the request dividing unit 1021 analyzes the processing request, and extracts the number of the object processed devices 2000 (number of processing object devices) (step S114). Next, the request dividing unit 1021 reads performance information of the processing unit 1022 from the performance storing section 1041, and determines whether the processing unit 1022 is capable of processing the processing object devices of the number extracted (step S115). If they can be processed, the request dividing unit 1021 commits that the self sub device 1000 processes the unexecuted processing request (step S117). However, if the number of extracted processing object devices exceeds the number that the processing unit 1022 is capable of processing, which is determined according to the processing capacity of the processing unit 1022, and the request dividing unit 1021 determines that the devices of that number cannot be processed (NO in step S115), the request dividing unit 1021 divides the unexecuted processing request into a processing request including description of one or more processed devices 2000 to be processed by the processing unit 1022 and description of the processing content to be performed thereon, and a processing request including description of the remaining processed devices 2000 and description of a processing content to be performed thereon (step S116). Then, the request dividing unit 1021 commits that the self sub device 1000 performs processing of the former processing request (step S117).

FIG. 4 shows the details of the step S116. First, the request dividing unit 1021 extracts description of the processed devices of the number capable of being processed by the processing unit 1022 from the unexecuted processing request present in the request storing section 111 (step S1161). This may be extracted in order from the head of the list, or at random. Next, the request dividing unit 1021 deletes the extracted description of the processed devices from the original unexecuted processing request (step S1162). Finally, the request dividing unit 1021 creates a new unexecuted processing request including description of the extracted processed devices, and add this request into the request storing section 111 (step S1163).

Next, the request dividing unit 1021 determines whether or not commit of the processing request is performed successfully (step S118). If it is performed successfully, the request dividing unit 1021 proceeds to the step S119, and if it is failed, the request dividing unit 1021 goes back to the step S111 and repeats searching for a new unexecuted processing request. If another sub device 1000 has committed to perform the unexecuted processing request searched in the step S111, the commit ends unsuccessfully. At this time, the dividing of the processing request performed in the step S116 is also invalidated. That is, a dividing process and acceptance of an unexecuted processing request with respect to one unexecuted processing request present in the request storing section 111 is performed exclusively among the sub devices 2000.

If the commit of the processing request is performed successfully, the request dividing unit 1021 notifies the processing unit 1022 of the committed processing request, and the processing unit 1022 executes the notified processing request (step S119). Thereby, the corresponding processed device 2000 is accessed from the processing unit 1022 over the network 3000, and the processing descried in the processing request is executed. When the execution of the processing request ends, the processing unit 1022 writes the processing result into the request storing section 111 via the request management unit 121 of the main device 100 (step S120). Then, control is back to the request dividing unit 1021, and the processing is repeated again from the step S111.

3) Reference of Processing Result

In the case of referring to the processing result of the processing request stored in the request storing section 111 of the main device 100, the system manager inputs a reference request from the input device 1010 of any sub device 1000 (step S131 in FIG. 5). The input reference request is transmitted from the sub device 1000 to the request management unit 121 of the main device 100, and is returned to the sub device 1000 of the origin of the request from which the processing result of the processing request is taken out from the request storing section 111 by the request management unit 121 (step S132). The sub device 1000 outputs the returned processing result from the output device 1030 (step S133).

Next, operation of the exemplary embodiment will be described in more detail with a simple example. As an example, it assumes that the processed devices 2000 are web servers, and the sub devices 1000 are distribution servers which distribute an application program to the web servers. Further, it assumes that there are four web servers 1 to 4, and two distribution servers A and B, and each of the distribution servers A and B is capable of distributing an application program to two web servers at maximum simultaneously.

FIG. 6(*a*) shows a state where an unexecuted processing request RQ1 is stored in the request storing section 111. The processing request RQ1 includes a description section of object web servers and a description section of a processing content to be performed thereon. The description section of the object web servers contains a list of IP addresses of the respective web servers. The description section of the processing content includes an item "content" indicating processing type, and "distribution" is set therein. The description section further includes items such at "status" indicating whether the processing state is unexecuted, in execution, or executed, "processing device" indicating the identifier of a distribution server which executes processing, and "application" indicating the location where an application program to be distributed is present.

If a distribution server A, of the two distribution servers A and B, searches for the processing request RQ1 in the state shown in FIG. 6(*a*), four processing object devices are described in the processing request RQ1, which exceeds the number capable of being processed by the processing unit 1022. As such, the request dividing unit 1021 divides the request into two processing requests RQ11 and RQ12, each describing two processing object devices, as shown in FIG. 6(*b*). In one processing request RQ11, the request dividing unit 1021 sets "in execution" to the "status", and sets "distribution server A" to the "processing device", and causes the processing unit 1022 to perform the processing request RQ11. Thereby, the processing unit 1022 of the distribution server A starts distribution of the application program to the web servers 1 and 2.

When the other distribution server B searches the request storing section 111 which is the state shown in FIG. 6(*b*), an unexecuted processing request RQ12 is found. In the processing request RQ12, two processing object devices are described. Since this does not exceeds the number capable of being processed by the processing unit 1022, the request dividing unit 1021 sets "in execution" in the "status", and "distribution server B" to the "processing device" as shown in FIG. 6(*c*), and causes the processing unit 1022 to perform the processing request RQ12. Thereby, the processing unit 1022 of the distribution server B starts distribution of the application program to the web servers 3 and 4.

When distribution of the application program by the processing units 1022 of the distribution servers A and B is completed, the processing result is reflected on the "status" of the processing requests RQ11 and RQ12 of the request storing section 111, and "executed" is set as shown in FIG. 6(*d*).

Next, effects of the exemplary embodiment will be described.

According to the exemplary embodiment, load sharing can be performed in units smaller that the processing request unit created. This is because each sub device 1000 has the request dividing unit 1021 which divides an unexecuted processing request stored in the request storing section 111 into two processing requests, if required. Consequently, the load placed on the system manager creating processing requests can be reduced significantly compared with the case of creating a processing request for each processed device. Further, compared with the case of creating a processing request for each processed device, an effect that each sub device 1000 is not needed to take in a processing request for a plurality of times can be achieved.

Further, according to the exemplary embodiment, as searching for an unexecuted processing request to be able to be processed by each sub device 1000 and division of a processing request are performed in parallel by a plurality of sub devices 1000, processing for load sharing will not be concentrated on specific devices.

[Second Exemplary Embodiment]

Referring to FIG. 7, compared with the first exemplary embodiment shown in FIG. 1, a second exemplary embodiment of the invention is different from the first exemplary embodiment in an aspect that the storage device 1040 of each sub device 1000 includes a selection reference information storing section 1042, and when the request dividing unit 1021 extracts description for processed devices of the number capable of being processed from an unexecuted processing request, the request dividing unit 1021 selects appropriate description of processed devices by referring to selection reference information stored in the selection reference information storing section 1042.

The selection reference information stored in the selection reference information storing section 1042 includes network bands between the self sub device 1000 and the respective processed devices 2000, communication delay times, and an order of priority of the respective processed devices 2000.

In the case of using network bands between the self sub device 1000 and the respective processed devices 2000 as selection reference information, the request dividing unit 1021 extracts top N pieces (N is the number capable of being processed by the processing unit 1022 of the self sub device 1000, this also applies in the below description) of processed devices having large network bands with the self sub devices 1000, from the description of the processed devices included in the unexecuted processing request.

In the case of using network delay times between the self sub device 1000 and the respective processed devices 2000 as the selection reference information, the request dividing unit 1021 extracts the top N pieces of processed devices having short network delay time with the self sub device 1000, from the description of the processed devices included in the unexecuted processing request.

In the case of using an order of priority of the respective processed devices 2000 as selection reference information, the request dividing unit 1021 extracts top N pieces of processed devices having high propriety, from the description of the processed devices included in the unexecuted processing request.

Next, operation of the exemplary embodiment will be described in more detail with use of a simple example which is the same as the example used in the description of the first exemplary embodiment.

When a distribution server A, of two distribution servers A and B, searches for a processing request RQ1 in the state shown in FIG. 8(*a*), as description of four processing object devices are included in this processing request RQ1, this exceeds the number capable of being processed by the processing unit 1022. As such, the request dividing unit 1021 divides the request into two processing requests RQ11 and RQ12, each describing two processing object devices, as shown in FIG. 8(*b*). In one processing request RQ11, the request dividing unit 1021 sets “in execution” to the “status”, and “distribution server A” to the “processing device”, and causes the processing unit 1022 to perform the processing request RQ11. Now, when comparing FIG. 8(*b*) and FIG. 6(*b*), the difference is that although web servers 1 and 2 are processing objects in the processing request RQ11 in FIG. 6(*b*), web servers 1 and 3 are processing objects in the processing request RQ11 in FIG. 8(*b*). This is because selection is performed according to selection reference information that a network delay from the distribution server A is smaller in the web servers 1 and 3 belonging to a sub network of aaa.aaa.aaa.xxx than in the web servers 2 and 4 belonging to a sub network of bbb.bbb.bbb.xxx. Thereby, the processing unit 1022 of the distribution server A is capable of performing distribution of the application program to the web servers 1 and 3 with a smaller network delay.

When the other distribution server B searches the request storing section 111 in the state shown in FIG. 8(*b*), an unexecuted processing request RQ12 is found. In the processing request RQ12, two processing object devices are written. As this does not exceeds the number of devices capable of being processed by the processing unit 1022, the request dividing unit 1021 sets “in execution” in the “status” of the processing request RQ12, sets “distribution server B” to the “processing device”, and causes the processing unit 1022 to perform the processing request RQ12. Thereby, the processing unit 1022 of the distribution server B starts distribution of the application program to the web servers 2 and 4. When distribution of the application program by the processing units 1022 of the distribution servers A and B is completed, the processing result is reflected on the “status” of the processing requests RQ11 and RQ12 in the request storing section 111, and “executed” is set as shown in FIG. 8(*d*).

Next, effects of the exemplary embodiment will be described.

According to the exemplary embodiment, the same effects as those of the first exemplary embodiment can be achieved, and at the same time, division of a processing request can be performed appropriately. This is because when description of processed devices of the number capable of being processed are extracted from an unexecuted processing request, description of appropriate processed devices are selected with reference to selection reference information stored in the selection reference information storing section 104.

[Third Exemplary Embodiment]

Referring to FIG. 9, an information processing system according to a third exemplary embodiment of the invention includes a plurality of sub devices 1100 and a main device 200 connected in a communicable manner with the plurality of sub devices 1100. Further, the respective sub devices 1100 are connected with a plurality of processed devices 2000 over a network 3000.

The main device 200 is a computer which stores and manages processing requests describing processing to be performed on the processed devices 2000, and includes storage devices 110 and 130 and data processing device 120.

The storage device 110 is the same as that of the first exemplary embodiment, which stores one or more processing requests.

The data processing device 120 is configured of a CPU of a computer or the like and includes a request management unit 121 and a request dividing unit 122.

The request management unit 121 is the same as that of the first exemplary embodiment, which manages input and output of processing requests to the request storing section 111.

The request dividing unit 122 is a unit for reading a processing request stored in the request storing section 111 via the request management unit 121, and divides the request if required and distributes to the respective sub devices 1100. The request dividing unit 122, divides a processing request if the number of processing object devices (number of processed devices 2000) contained in an unexecuted processing request exceeds the number of processed devices capable of being processed by the processing unit 1022 of the request distribution destination, which is determined from the processing capacity of the processing unit 1022. Specifically, the request dividing unit 122 divides the unexecuted processing request into a processing request including description of one or more processed devices to be processed by the processing unit 1022 of the sub device 1100 and description of a processing content to be performed thereon, and a processing request including description of the remaining processed devices and description of a processing content to be performed thereon.

The storage device 130 is configured of a hard disk or the like, and includes a performance storing section 131 which stores performance information of the processing units 1022 of the respective sub devices 1100. The performance information to be stored in the performance storing section 131 may be static performance information such as clock frequency of the CPU configuring the data processing device 1022 of each of the sub devices 1100, or information indicating load conditions such as CPU utilization and available memory at that time. Alternatively, the information may be the number of processed devices which can be processed at one time.

Each of the sub devices 1100 is a computer which shares and performs processing on the processed devices 2000, and includes an input device 1010, a data processing device 1020, and an output device 1030.

The input device 1010 and the output device 1030 are the same as those of the first exemplary embodiment.

The data processing device 1020 is configured of a CPU of a computer or the like, and has a processing unit 1022. The processing unit 1022 is a unit for executing processing requested by the request dividing unit 1021 of the main device 200 on the processed devices 2000.

The processed devices 2000 and the network 3000 are the same as those of the first exemplary embodiment. Although in FIG. 9 the respective sub devices 1100 and the processed devices 2000 are connected over the network 3000, the respective sub devices 1100 and the main device 200 may also be connected over the network 3000.

Next, operation of the exemplary embodiment will be described.

1) Registration of Processing Request

Registration of a processing request in the request storing section 111 of the main device 200 is performed from the input device 1010 of any sub device 1100 in the same manner as that of the first exemplary embodiment (steps S101, S102 in FIG. 2).

2) Processing of Processing Request

The request dividing unit 122 of the data processing device 120 of the main device 200 periodically searches the request storing section 111 for an unexecuted processing request (step S201 in FIG. 10). If no unexecuted processing request is found (NO in step S202), the request dividing unit 122 waits for a certain period of time (step S203), and returns to the processing of the step S201 and performs searching again.

If an unexecuted processing request is found (YES in step S202), the request dividing unit 122 selects a sub device 1100 for processing the unexecuted processing request (step S204). For this selection, any method can be used, including selecting a plurality of sub devices 1100 capable of processing the processing request by the round robin system. Next, the request dividing unit 122 analyzes the processing request and extracts the number of the processed devices 2000 which are the processing objects (step S205). Then, the request dividing unit 122 reads out from the performance storing section 131 performance information of the processing units 1022 of the selected sub device 1100, and determines whether the processing object devices of the extracted number are capable of being processed by the processing unit 1022 (step S206).

If they are capable of being processed, the request dividing unit 122 transmits the unexecuted processing request to the sub device 1100 so as to cause the request to be processed (step S208). However, if the request dividing unit 122 determines that the number of extracted processing object devices exceeds the number capable of being processed by the processing unit 1022 of the sub device 1100, which is determined from the processing capacity thereof, so that the devices of that number cannot be processed (NO in step S206), the request dividing unit 122 divides the unexecuted processing request into a processing request including description of one or more processed devices 2000 to be processed by the processing unit 1022 of the sub device 1100 and description of the processing content to be performed thereon, and a processing request including description of the remaining processed devices 2000 and description of the processing content to be performed thereon (step S207 and FIG. 4). Then, the request dividing unit 122 transmits the former processing request to the sub device 1100 for processing (step S208). Then, the request dividing unit 122 returns to the processing of the step S201, and repeats the above-described processing.

When the processing unit 1022 of the sub device 1100 receives the processing request from the main device 200 (step S211 in FIG. 11), the processing unit 1022 executes the processing request (step S212). Thereby, the corresponding processed devices 2000 are accessed from the processing unit 1022 over the network 3000, and the processing described in the processing request is executed. When the processing unit 1022 ends processing of the processing request, the processing unit 1022 writes the processing result into the request storing section 111 via the request management unit 121 of the main device 200 (step S213).

3) Reference of Processing Result

Reference of the processing result of the processing request stored in the request storing section 111 of the main device 200 can be performed using the input device 1010 and the output device 1030 of any sub device 1100 in the same manner as that of the first exemplary embodiment (step S131 to S133 in FIG. 5).

Next, operation of the exemplary embodiment will be described more specifically with use of a simple example (FIG. 6) which is the same as that used in describing the first exemplary embodiment.

When the request dividing unit 122 of the main device 200 searches for the processing request RQ1 in the state shown in FIG. 6(*a*) and selects the distribution server A as a distribution server for processing the request, as this processing request RQ1 describes four processing object devices which exceeds the number capable of being processed by the processing unit 1022 of the distribution server A, the request dividing unit 122 divides the request into two processing requests RQ11 and RQ12 each describing two processing object devices as shown in FIG. 6(*b*), and transmits one processing request RQ11 to the distribution server A to thereby cause the server to process the request. At this time, the request dividing unit 122 sets "in execution" to the "status", and "distribution server A" to the "processing device", in the processing request RQ11.

Then, when the request dividing unit 122 of the main device 200 searches for the processing request RQ12 in the state shown in FIG. 6(*b*) and selects the distribution server B as a distribution server for processing the request, as this processing request RQ12 describes two processing object devices, which does not exceeds the number capable of being processed by the processing unit 1022 of the distribution server B, the request dividing unit 122 transmits the processing request RQ12 to the distribution server B to thereby cause the server to process the request. At this time, the request dividing unit 122 sets "in execution" to the "status" and "distribution server B" to the "processing device", in the processing request RQ12 as shown in FIG. 6(*c*).

When the distribution server A and the distribution server B end distribution processing of the application program by the processing units 1022, they reflect the processing result on the "status" of the processing requests RQ11 and RQ12 in the request storing section 111. Thereby, "executed" is set as shown in FIG. 6(*d*).

Next, effects of the exemplary embodiment will be described.

According to the exemplary embodiment, load sharing can be performed in units smaller that the created processing request unit. This is because the main device 200 has the request dividing unit 122 which divides an unexecuted processing request stored in the request storing section 111 into two processing requests, if required. Consequently, the load placed on the system manager creating processing requests can be reduced significantly compared with the case of creating a processing request for each processed device.

Further, according to the exemplary embodiment, as searching for an unexecuted processing request and division of a processing request, which are to be performed by the respective sub devices 1100, are performed by the main device 200 side, the load placed on each sub device 1100 can be reduced.

[Fourth Exemplary Embodiment]

Referring to FIG. 12, a fourth exemplary embodiment of the invention is different from the third exemplary embodiment shown in FIG. 9 in that the storage device 130 of the main device 200 has a selection reference information storing section 132, and when the request dividing unit 122 extracts description of processed devices of the number capable of being processed from an unexecuted processing request, the request dividing unit 122 refers to selection reference information stored in the selection reference information storing section 132 to thereby select description of the appropriate processed devices.

The selection reference information stored in the selection reference information storing section 132 includes network bands between the respective sub devices 1100 and the respective processed devices 2000, communication delay times, and an order of priority of the respective processed devices 2000.

In the case of using network bands between the respective sub devices 1100 and the respective processed devices 2000 as selection reference information, the request dividing unit 122 extracts top N pieces (N is the number capable of being processed by the processing unit 1022 of the corresponding sub device 1100, this also applies to the below description) of the processed devices having large network bands with the sub device 1100 selected for processing the processing request, from the description of the processed devices included in the unexecuted processing request.

In the case of using network delay times between the respective sub devices 1100 and the respective processed devices 2000 as the selection reference information, the request dividing unit 122 extracts top N pieces of processed devices having short network delay time with the sub device 1100 selected for processing the processing request, from the description of the processed devices included in the unexecuted processing request.

In the case of using an order of priority of the respective processed devices 2000 as selection reference information, the request dividing unit 122 extracts top N pieces of processed devices having high propriety, from the description of the processed devices included in the unexecuted processing request.

Next, operation of the exemplary embodiment will be described in more detail with use of a simple example (FIG. 8) which is the same as the example used in the description of the third exemplary embodiment.

When the request dividing unit 122 of the main device 200 searches for the processing request RQ1 in the state shown in FIG. 8(*a*) and selects the distribution server A as a distribution server for processing the request, as this processing request RQ1 describes four processing object devices, which exceeds the number capable of being processed by the processing unit 1022 of the distribution server A, the request dividing unit 122 divides the request into two processing requests RQ11 and RQ12, each of which describes two processing object devices as shown in FIG. 8(*b*), and transmits one processing request RQ11 to the distribution server A to thereby cause the server to process the request. At this time, when comparing FIG. 8(*b*) and FIG. 6(*b*), there is a difference that although the web servers 1 and 2 are processing objects in the processing request RQ11 in FIG. 6(*b*), the web servers 1 and 3 are processing objects in the processing request RQ11 in FIG. 8(*b*). This is because selection is performed according to selection reference information indicating that a network delay from the distribution server A is smaller in the web servers 1 and 3 belonging to a sub network of aaa.aaa.aaa.xxx than in the web servers 2 and 4 belonging to a sub network of bbb.bbb.bbb.xxx. Thereby, the processing unit 1022 of the distribution server A is capable of distributing the application program to the web servers 1 and 3 with a smaller network delay.

Then, when the request dividing unit 122 of the main device 200 searches for the processing request RQ12 in the state shown in FIG. 8(*b*) and selects the distribution server B as a distribution server for processing the request, as this processing request RQ12 describes two processing object devices, which does not exceeds the number capable of being processed by the processing unit 1022 of the distribution server B, the request dividing unit 122 transmits the processing request RQ12 to the distribution server B to thereby cause the server to process the request. Then, when the distribution servers A and B end distribution of the application program, the processing result is reflected on the "status" of the processing requests RQ11 and RQ12 in the request storing section 111, and "executed" is set as shown in FIG. 8(*d*).

Next, effects of the exemplary embodiment will be described.

According to the exemplary embodiment, the same effects as those of the third exemplary embodiment can be achieved, and at the same time, division of a processing request can be performed appropriately. This is because when extracting description of processed devices of the number capable of being processed from an unexecuted processing request, description of appropriate processed devices are selected with reference to selection reference information stored in the selection reference information storing section 132.

[Fifth Exemplary Embodiment]

Referring to FIG. 13, a fifth exemplary embodiment of the invention is different from the third exemplary embodiment shown in FIG. 9 in that the data processing device 120 of the main device 200 has a request dividing unit 123 instead of the request dividing unit 122, and the data processing device 1020 of each sub device 1100 further has a candidacy unit 1023.

The candidacy unit 1023 of each sub device 1100 has a function of periodically searching the request storing section 111 of the main device 200 and writing the identifier of the self device as a candidate of a processing unit for processing an unexecuted processing request, if the processing unit 1022 of the self device is in a state capable of performing processing of a processing request.

The request dividing unit 123 of the main device 200 selects a sub device 1100 for performing the unexecuted processing request in the request storing section 111 among the sub devices 1100 which are candidates for the processing request. This is the difference aspect of the exemplary embodiment from the third exemplary embodiment.

Next, operation of the exemplary embodiment will be described.

1) Registration of Processing Request

Registration of processing request in the request storing section 111 of the main device 200 is performed from the input device 1010 of any sub device 1100, in the same manner as the case of the third exemplary embodiment (steps S101 and S102 in FIG. 2).

2) Processing of Processing Request

If the processing unit 1022 of the self device is capable of processing the processing request, the candidacy unit 1023 in the data processing device 1020 of each sub device 1100 executes processing shown in FIG. 14. First, the candidacy unit 1023 searches for any unexecuted processing request in the request storing section 111 of the main device 200 (step S301 in FIG. 14). If no unexecuted processing request is found (NO in step S302), the candidacy unit 1023 waits for a certain time (step S303), and returns to the step S301 and performs searching again.

If any unexecuted processing request is found (YES in step S302), the candidacy unit 1023 writes in the processing request an identifier of the self device as a candidate device for performing the processing request (step S304). Then, the candidacy unit 1023 waits for a result from the main device 200. If the self device is not selected (NO in step S305), the candidacy unit 1023 returns to the step S310 and performs searching again. If the self device is selected and the processing request is transmitted from the main device 200, the candidacy unit 1023 causes the processing unit 1022 to execute the received processing request (step S306). Then, when the execution is completed, the candidacy unit 1023 reflects the processing result on the request storing section 111 (step S307).

On the other hand, the request dividing unit 123 in the data processing device 120 of the main device 200 periodically searches for an unexecuted processing request, to which candidates have been set, in the request storing section 111 (step S311 in FIG. 15). If no unexecuted processing request with candidates is found (NO in step S312), the request dividing unit 123 waits for a certain period of time (step S313), and returns to the processing of the step S311 and performs searching again.

If an unexecuted processing request with candidates is found (YES in step S312), the request dividing unit 123 selects a sub device 1100 for processing the unexecuted processing request, from the candidates (step S314). If there is an unselected candidate, the request dividing unit 123 notifies the sub device 1100 of the fact (step S315), and then performs the following processing related to the selected sub device 1100.

First, the request dividing unit 123 analyzes the processing request, and extracts the number of the object processed devices 2000 (step S316). Next, the request dividing unit 123 reads out performance information of the processing unit 1022 of the selected sub device 1100 from the performance storing section 131, and determines whether the processing object devices 1022 of the extracted number are capable of being processed (step S317). If the devices are capable of being processed, the request dividing unit 123 transmits the unexecuted processing request to the sub device 1100 for processing (step S319). In contrast, if the extracted number of processing object devices exceeds the number capable of being processed by the processing unit 1022 of the sub device 1100 which is determined from the processing capacity thereof, and it is determined as not being able to be processed (NO in step S317), the request dividing unit 123 divides the unexecuted processing request into a processing request including description of one or more processed devices 2000 to be processed by the processing unit 1022 of the sub device 1100 and description of a processing content to be performed thereon, and a processing request including description of the remaining processed devices 2000 and description of a processing content to be performed thereon (step S318 and FIG. 4). Then, the request dividing unit 123 transmits the former processing request to the sub device 1100 for processing (step S319). Then, the request dividing unit 123 returns to the processing of the step S311, and repeats the processing.

3) Reference of Processing Result

Reference to the processing result of the processing request stored in the request storing section 111 of the main device 200 can be performed using the input device 1010 and the output device 1030 of any sub device 1100 in the same manner as that of the first exemplary embodiment (step S131 to S133 in FIG. 5).

Next, operation of the exemplary embodiment will be described more specifically with use of a simple example which is the same as that used in describing the first exemplary embodiment.

In the state where the unexecuted processing request RQ1 as shown in FIG. 16(*a*) is stored in the request storing section 111 of the main device 200, it assumes that two servers, that is, a distribution server A and a distribution server B, execute processing shown in FIG. 14. In this case, the distribution server A and the distribution server B search for the unexecuted processing request RQ1, and write the identifiers of the self devices into the "processing device" of the processing request RQ1, as shown in FIG. 16(*b*) (step S304 in FIG. 14).

Then, it assumes that the request dividing unit 123 of the main device 200 searches for the processing request RQ1 in the state shown in FIG. 16(*b*). In this case, as the two servers, that is, the distribution server A and the distribution server B, are written as candidates, the request dividing unit 123 refers to the performance storing section 131, and selects one distribution server having higher performance, for example (step S314 in FIG. 15). In this case, it assumes that the distribution server A is selected. Next, as the processing request RQ1 describes four processing object devices which exceeds the number capable of being processed by the processing unit 1022 of the distribution server A, the request dividing unit 123 divides the processing request into two processing requests RQ11 and RQ12, each of which describes two processing object devices, as shown in FIG. 16(*c*), and transmits the processing request RQ11 to the distribution server A so as to cause the server to process the request. At this time, the request dividing unit 123 sets "in execution" to the "status" and "distribution server A" to the "processing device" in the processing request RQ11. On the other hand, the request dividing unit 123 notifies the distribution server B of the fact of not being selected.

When the unselected distribution server B again searches for an unexecuted processing request, the processing request RQ12 is found, so the distribution server B announces its candidacy for processing the request. If no other candidate appears until the request dividing unit 123 of the main device 200 performs searching next time, processing of the processing request RQ12 is determined to be performed by the distribution server B, and the request dividing unit 123 sets "in execution" to the "status" and "distribution server B" to the "processing device" in the processing request RQ12, as shown in FIG. 16(*d*).

When the distribution processing of the application program by the processing units 1022 ends, the distribution server A and the distribution server B reflect the processing result on the "status" of the processing requests RQ11 and RQ12 in the request storing section 111. Thereby, "executed" is set as shown in FIG. 16(*e*).

Next, effects of the exemplary embodiment will be described.

According to the exemplary embodiment, the same effects as those of the third exemplary embodiment can be achieved, and also the processing request can be processed by an appropriate sub device 1100. This is because, with respect to an unexecuted processing request, a device which executes the processing request is selected from sub devices desiring to perform the processing.

Note that in the exemplary embodiment, when determining the number of processed devices capable of being processed by the processing unit 1022 of a sub device 1100 and determining a selected candidate, the request dividing unit 123 of the main device 200 refers to the performance information stored in the performance storing section 131. However, it is also acceptable that candidate sub devices 1100 write the identifiers and performance information of the self devices into the item "processing device" in the processing request, and that the request dividing unit 123 determines the number of devices capable of being processing and a selected candidate, based on the written performance information.

[Sixth Exemplary Embodiment]

Referring to FIG. 17, a sixth exemplary embodiment of the invention is different from the fifth exemplary embodiment shown in FIG. 13 in that the storage device 130 of the main device 200 has a selection reference information storing section 132, and when the request dividing unit 123 extracts description of processed devices of the number capable of being processed from an unexecuted processing request, the request dividing unit 123 refers to selection reference information stored in the selection reference information storing section 132 to thereby select description of the appropriate processed devices.

The selection reference information stored in the selection reference information storing section 132 includes network bands between the respective sub devices 1100 and the respective processed devices 2000, communication delay times, and an order of priority of the respective processed devices 2000.

In the case of using network bands between the respective sub devices 1100 and the respective processed devices 2000 as selection reference information, the request dividing unit 123 extracts top N pieces (N is the number capable of being processed by the processing unit 1022 of the corresponding sub device 1100, this also applies to the below description) of the processed devices having large network bands with the sub device 1100 selected for processing the processing request, from the description of the processed devices included in the unexecuted processing request.

In the case of using network delay times between the respective sub devices 1100 and the respective processed devices 2000 as the selection reference information, the request dividing unit 123 extracts top N pieces of processed devices having short network delay time with the sub device 1100 selected for processing the processing request, from the description of the processed devices included in the unexecuted processing request.

In the case of using an order of priority of the respective processed devices 2000 as selection reference information, the request dividing unit 123 extracts top N pieces of processed devices having high propriety, from the description of the processed devices included in the unexecuted processing request.

Next, effects of the present invention will be described.

According to the exemplary embodiment, the same effects as those of the fifth exemplary embodiment can be achieved, and at the same time, division of a processing request can be performed appropriately. This is because when description of processed devices of the number capable of being processed are extracted from an unexecuted processing request, description of appropriate processed devices are selected with reference to selection reference information stored in the selection reference information storing section 132.

[Seventh Exemplary Embodiment]

Referring to FIG. 18, a seventh exemplary embodiment of the invention is different from the third exemplary embodiment shown in FIG. 9 in that the data processing device 120 of the main device 200 has a candidate selection unit 124 instead of the request dividing unit 122, and in each sub device 1100, the data processing device 1020 has a request dividing unit 1024 which is a new element, and each sub device 1100 includes a storage device 1040 having a performance storage section 1041.

The request dividing unit 1024 of each sub device 1100 has a function of periodically searching the request storing section 111 of the main device 200 and writing the identifier of the self device as a candidate of a processing unit for processing an unexecuted processing request, if the processing unit 1022 of the self device is in a state capable of performing processing of a processing request. Further, the request dividing unit 1024 has a function of, when the self device is selected as a processing device, dividing the processing request as required.

The performance storing section 1041 of each sub device 1100 stores performance information of the processing unit 1022 which is the same as that of the first exemplary embodiment.

The candidate selection unit 124 of the main device 200 is a device for selecting a sub device 1100 for processing an unexecuted processing request in the request storing section 111 from sub devices 1100 which declare candidacy with respect to the processing request.

Next, operation of the exemplary embodiment will be described.

1) Registration of Processing Request

Registration of processing request to the request storing section 111 of the main device 200 can be performed from the input device 1010 of any sub device 1100, in the same manner as the case of the third exemplary embodiment (steps S101 and S102 in FIG. 2).

2) Processing of Processing Request

If the processing unit 1022 of the self device is capable of processing the processing request, the request dividing unit 1024 in the data processing device 1020 of each sub device 1100 executes processing shown in FIG. 19. First, the request dividing unit 1024 searches for any unexecuted processing request in the request storing section 111 of the main device 200 (step S401). If no unexecuted processing request is found (NO in step S402), the request dividing unit 1024 waits for a certain period of time (step S403), and returns to the step S401 and performs searching again.

If any unexecuted processing request is found (YES in step S402), the request dividing unit 1024 writes in the processing request the identifier of the self device as a candidate device for performing the processing request (step S404), and then waits for a result from the main device 200. If the self device is not selected (NO in step S405), the request dividing unit 1024 returns to the step S401 and performs searching again. If the self device is selected, the request dividing unit 1024 performs the following processing.

First, the request dividing unit 1024 refers to the unexecuted processing request, for which the self device is selected as an executing device, from the request storing section 111 via the request management unit 121, and analyzes it to thereby extract the number of object processed devices (step S406). Next, the request dividing unit 1024 reads out performance information of the processing unit 1022 from the performance storing section 1041, and determines whether the processing object devices of the extracted number can be processed by the processing unit 1022 (step S407). If they can be processed, the unexecuted processing request is executed by the processing unit 1022 (step S409). However, if the request dividing unit 1024 determines that the extracted number of processing objects devices exceeds the number of devices capable of being processed, which is determined from the processing capacity of the processing unit 1022, and determines that the devices cannot be processed (NO in step S407), the request dividing unit 1024 divide the unexecuted processing request into a processing request including description of one or more processed devices 2000 that the processing unit 1022 performs processing and description of the processing content to be performed thereon, and an unexecuted processing request including description of the remaining processed devices 2000 and description of the processing content to be performed thereon (step S408). Then, the former processing request is executed by the processing unit 1022 (step S409). Then, when the processing unit 1022 ends processing of the processing request, writes the processing result into the request storing section 111 via the request management unit 121 of the main device 200 (step S410)

On the other hand, the candidate selection unit 124 in the data processing device 120 of the main device 200 periodically searches for any unexecuted processing request with candidates in the request storing section 111 (step S421 in FIG. 20). If no unexecuted processing request with candidates is found (NO in step S422), the candidate selection unit 124 waits for a certain period of time (step S423), and returns to the processing of the step S421 and executes searching again.

If any unexecuted processing request with candidates is found (YES in step S422), the candidate selection unit 124 selects a sub device 1100 for processing the unexecuted processing request from the candidates while referring to the performance information stored in the performance storing section 131 (step S424). Then, the candidate selection unit 124 notifies the respective candidates of the selection result (step S425). Thereafter, the candidate selection unit 124 returns to the processing of the step S421, and repeats the processing.

3) Reference of Processing Result

Reference to the processing result of the processing request stored in the request storing section 111 of the main device 200 can be performed using the input device 1010 and the output device 1030 of any sub device 1100 in the same manner as that of the third exemplary embodiment (step S131 to S133 in FIG. 5).

Next, operation of the exemplary embodiment will be described more specifically with use of a simple example (FIG. 16) which is the same as that used in describing the fifth exemplary embodiment.

In the state where the unexecuted processing request RQ1 shown in FIG. 16(*a*) is stored in the request storing section 111 of the main device 200, it assumes that two servers, that is, a distribution server A and a distribution server B, execute processing shown in FIG. 19. In this case, the distribution server A and the distribution server B search for the unexecuted processing request RQ1, and write the identifiers of the self devices into the item "processing device" of the processing request RQ1, as shown in FIG. 16(*b*) (step S404 in FIG. 19).

Then, it assumes that the candidate selection unit 124 of the main device 200 searches for the processing request RQ1 in the state shown in FIG. 16(*b*). In this case, as the two servers, that is, the distribution server A and the distribution server B, are written as candidates, the candidate selection unit 124 refers to the performance storing section 131 and selects one distribution server having higher performance, for example (step S424 in FIG. 20). In this case, it assumes that the distribution server A is selected. Then, the candidate selection unit 124 notifies the distribution server A that it is selected, and notifies the distribution server B that it is unselected (step S425).

When receiving the notification that it is selected, the request dividing unit 1024 of the distribution server A determines that as the processing request RQ1 describes four processing object devices, this exceeds the number of devices capable of being processed by the processing unit 1022 of the self server A, so that the request dividing unit 1024 divides the request into two processing requests RQ11 and RQ12, each of which describes two processing object devices, as shown in FIG. 16(*c*), and causes the processing unit 1022 of the self server A to process the processing request RQ11. At this time, the request dividing unit 1024 sets "in execution" to the "status" and "distribution server A" to the "processing device" in the processing request RQ11.

On the other hand, the distribution server B who receives the notification of the fact of not being selected again searches for an unexecuted processing request. When the distribution server B finds the processing request RQ12, the distribution server B declares its candidacy for processing the request. If no other candidate appears until the candidate selection unit 124 of the main device 200 performs searching next time, the processing request RQ12 is determined to be processed by the distribution server B, and "in execution" is set to the "status" and "distribution server B" is set to the "processing device" of the processing request RQ12, as shown in FIG. 16(*d*).

When the distribution processing of the application program by the processing units 1022 ends, the distribution server A and the distribution server B reflect the processing result on the "status" of the processing requests RQ11 and RQ12 in the request storing section 111. Thereby, "executed" is set as shown in FIG. 16(*e*).

Next, effects of the exemplary embodiment will be described.

According to the exemplary embodiment, the same effects as those of the third exemplary embodiment can be achieved, and also a processing request can be processed by an appropriate sub device 1100. This is because, with respect to an unexecuted processing request, a device which executes the processing request is selected from sub devices desiring to perform the processing.

Further, according to the exemplary embodiment, as division of a processing request is performed on each sub device 1100 side, load concentration on the main device 200 can be prevented.

Note that in the exemplary embodiment, when determining a selected candidate, the candidate selection unit 124 of the main device 200 refers to the performance information stored in the performance storing section 131. However, it is also acceptable that candidate sub devices 1100 write the identifiers and performance information of the self devices into the item "processing device" of the processing request, and that the candidate selection unit 124 determines the successful candidate based on the written performance information.

[Eighth Exemplary Embodiment]

Referring to FIG. 21, an eighth exemplary embodiment of the invention is different from the seventh exemplary embodiment shown in FIG. 18 in that the storage device 1040 of each sub device 1100 has a selection reference information storing section 1042, and when the request dividing unit 1024 extracts description of processed devices of the number capable of being processed from an unexecuted processing request, the request dividing unit 1024 refers to selection reference information stored in the selection reference information storing section 1042 to thereby select description of the appropriate processed devices.

The selection reference information stored in the selection reference information storing section 1042 includes network bands between the self sub device 1100 and the respective processed devices 2000, communication delay times, and an order of priority of the respective processed devices 2000.

In the case of using network bands between the self sub device 1100 and the respective processed devices 2000 as selection reference information, the request dividing unit 1024 extracts top N pieces (N is the number capable of being processed by the processing unit 1022 of the corresponding sub device 1100, this also applies to the below description) of the processed devices having large network bands with the self sub device 1100, from the description of the processed devices included in the unexecuted processing request.

In the case of using network delay times between the self sub device 1100 and the respective processed devices 2000 as the selection reference information, the request dividing unit 1024 extracts top N pieces of processed devices having short network delay time with the sub device 1100, from the description of the processed devices included in the unexecuted processing request.

In the case of using an order of priority of the respective processed devices 2000 as selection reference information, the request dividing unit 1024 extracts top N pieces of processed devices having high propriety, from the description of the processed devices included in the unexecuted processing request.

Next, effects of the present invention will be described.

According to the exemplary embodiment, the same effects as those of the seventh exemplary embodiment can be achieved, and at the same time, division of a processing request can be performed more appropriately. This is because when description of processed devices of the number capable of being processed are extracted from an unexecuted processing request, description of appropriate processed devices are selected with reference to selection reference information stored in the selection reference information storing section 1042.

Next, other embodiments of the present invention will be described.

The request dividing unit may be provided to each processing unit.

The present invention may include a plurality of sub devices and a main device capable of communicating with the sub devices, in which the main device includes the request storing section, and each of the sub devices includes the processing unit and the request dividing unit.

The request dividing unit of each sub device may periodically search the request storing section of the main device, and determine by itself a processing request to be processed by the self sub device.

The request dividing unit of each sub device may periodically search the request storing section of the main device and write the identifier of the self sub device into a processing request that the request dividing unit desires to process by the self sub device, and the main device may include a candidate selection unit which selects a sub device which processes a processing request stored in the request storing section from the sub devices that the identifiers thereof are written with respect to the processing request.

The request dividing unit may be shared by a plurality of processing units.

The present invention may include a plurality of sub devices and a main device capable of communicating with the sub devices, in which the main device includes the request storing section and the request dividing unit, and each sub device includes the processing unit.

The request dividing unit of the main device may periodically search the request storing section and determine a processing request to be processed and a sub device for processing the processing request.

The sub device may include a candidacy unit which periodically searches the request storing section of the main device and write an identifier of the self sub device in a processing request that the sub device desires to process by the self device, and the request dividing unit of the main device may periodically search the request storing section and determine a processing request to be processed, and determine a sub device for processing the processing request from among the sub devices that the identifiers thereof are written with respect to the processing request.

The present invention may include a selection reference information storing section which stores selection reference information, and the request dividing unit may select description of processed devices of the number commensurate with the processing capacity of the processing unit with reference to the selection reference information.

The load sharing method according to the exemplary embodiments of the invention is a load sharing method in an information processing system having a request storing section which stores a processing request including description of a plurality of object processed devices and description of a processing content to be performed thereon, and a plurality of processing units which share and execute a processing request. The method may be configured to include a first step in which a request dividing unit divides a processing request stored in the request storing section into processing requests, one of which includes description of processed devices of the number commensurate with the processing capacity of the processing unit and description of a processing content to be performed thereon, and a second step in which the processing unit executes the divided processing request.

The information processing device according to the exemplary embodiments of the invention may be configured as to include a processing unit which is connected with a main device having a request storing section which stores a processing request including description of a plurality of object processed devices and description of a processing content to be performed thereon, and executes a processing request, and a request dividing unit which divides a processing request stored in the request storing section into processing requests, one of which includes description of processed devices of the number commensurate with the processing capacity of the processing unit and description of a processing content to be performed thereon.

The request dividing unit may periodically search the request storing section of the main device and determine by itself a processing request which should be processed by the self sub device.

The request dividing unit may periodically searches the request storing section of the main device and write an identifier of the self sub device into a processing request that it desires to process by the self sub device, and wait to be selected by the main device as a device for executing the processing request.

The information processing device may include a request storing section which is connected in a communicable manner with a plurality of sub devices each having a processing unit which executes a processing request, and stores a processing request including description of a plurality of processed devices which are processing objects and description of a processing content to be performed thereon, and a request dividing unit which divides a processing request stored in the request storing section into processing requests, one of which includes description of processed devices of the number commensurate with the processing capacity of the processing unit and description of a processing content to be performed thereon.

The request dividing unit may periodically search the request storing section and determine a processing request to be processed and a sub device for processing the processing request.

The request dividing unit may periodically search the request storing section and determine a processing request to be processed and also determine a sub device for processing the processing request from among sub devices that identifiers thereof are written with respect to the processing request.

Although the exemplary embodiments of the invention have been described, the present invention is not limited to the above-described exemplary embodiments, and various additions and modifications can be made. For example, functions of the main device and the sub devices of the present invention can be realized not only as hardware but also computers and programs. A program for the main device is provided by being written on a computer readable recording medium such as a magnetic disk and a semiconductor memory, and is read by a computer when the computer is started, and by controlling operation of the computer, the computer works as the main device in each of the exemplary embodiments described above. Further, a program for a sub device is provided by being written on a computer readable recording medium such as a magnetic disk and a semiconductor memory, and is read by a computer when the computer is started, and by controlling operation of the computer, the computer works as a sub device in each of the exemplary embodiments described above. Further, the main device and the sub device are not necessarily different computers. A computer to be used as a sub device may be operated as the main device.

Industrial Applicability

As described above, the present invention is useful for a system in which a plurality of processed devices are shared and processed by a plurality of processing device. In particular, the present invention is suitable to be used for a system for managing a plurality of processed devices over a network such as distribution of an application program.

DESCRIPTION OF REFERENCE NUMERALS

Figure 1:
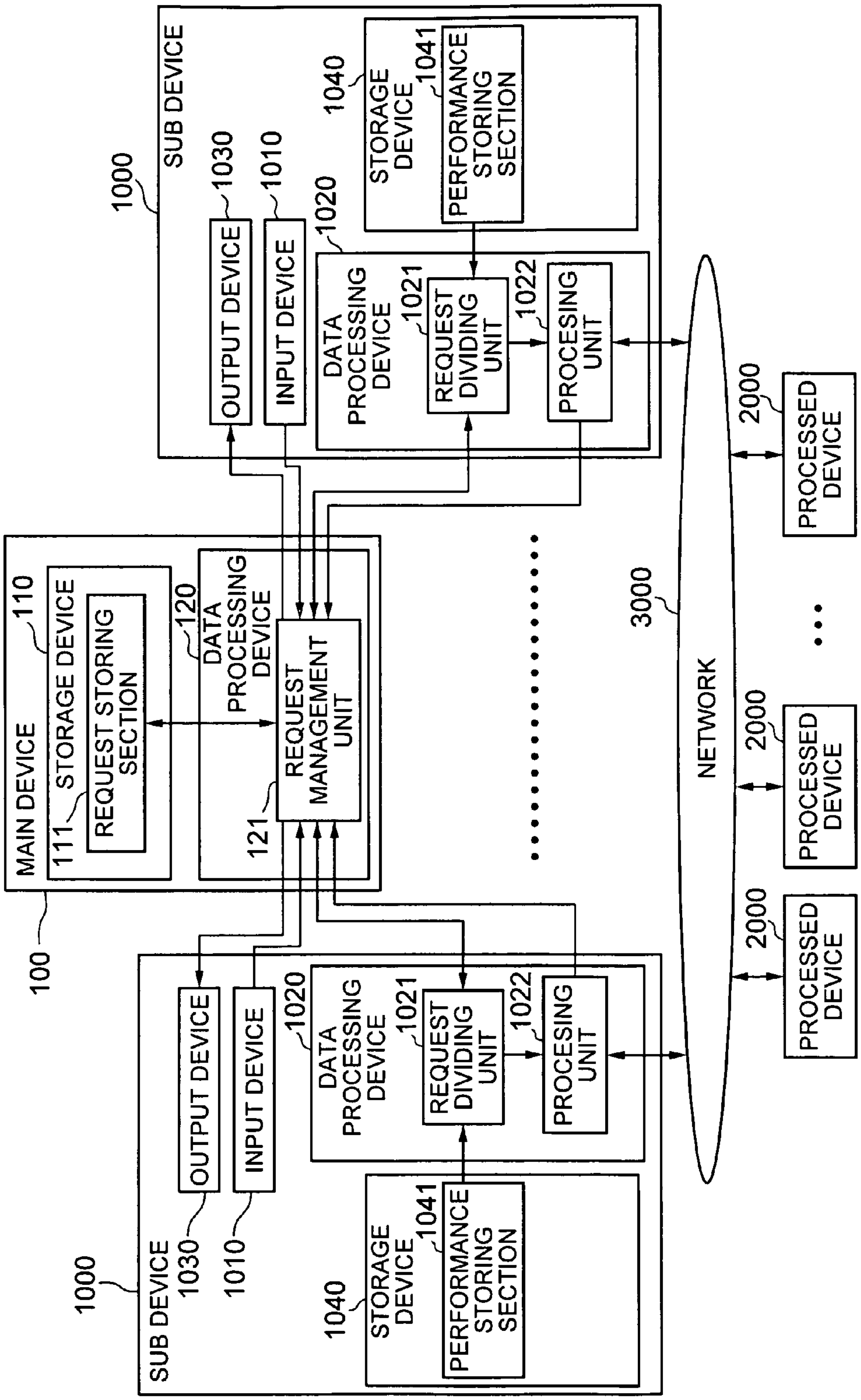
FIG. 1 is a block diagram showing a first exemplary embodiment of the invention.
Figure 2:
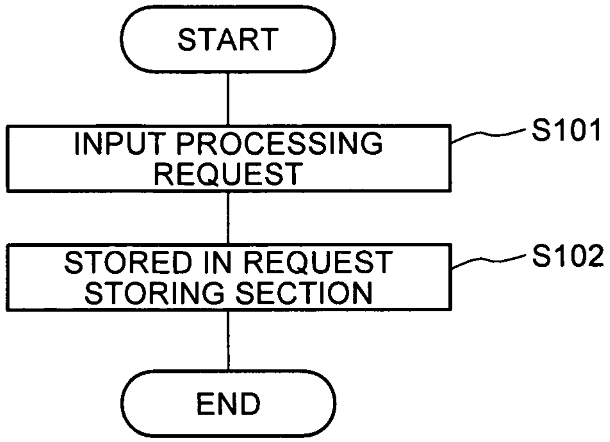
FIG. 2 is a flowchart showing an example of a registering process of a processing request in the first exemplary embodiment of the invention.
Figure 3:
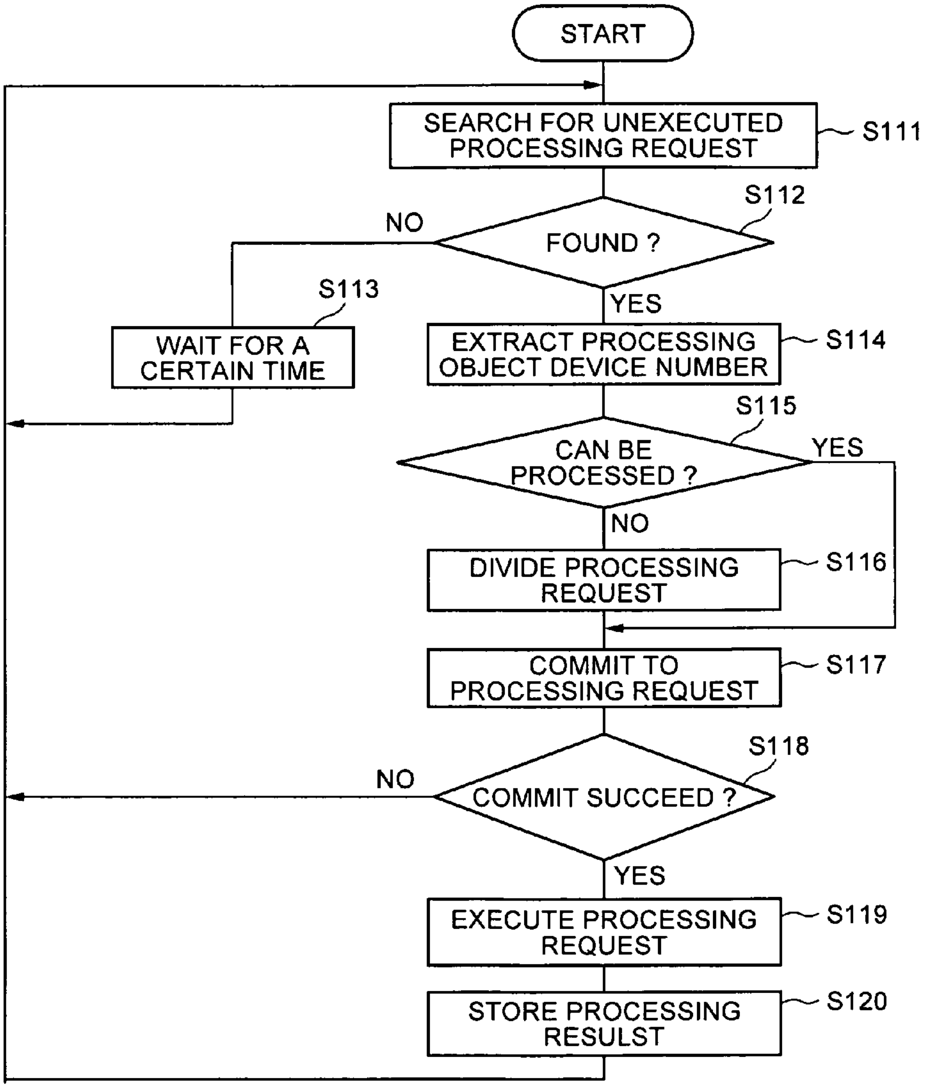
FIG. 3 is a flowchart showing exemplary processing of a data processing device of a sub device in the first exemplary embodiment of the invention.
Figure 4:
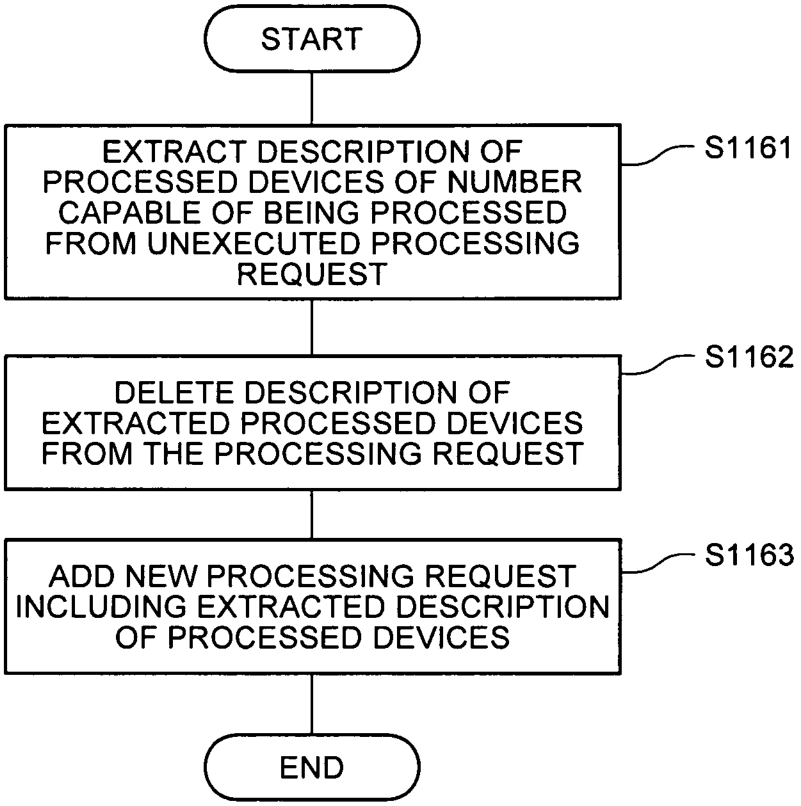
FIG. 4 is a flowchart showing an example of a dividing process of a processing request in the first exemplary embodiment of the invention.
Figure 5:
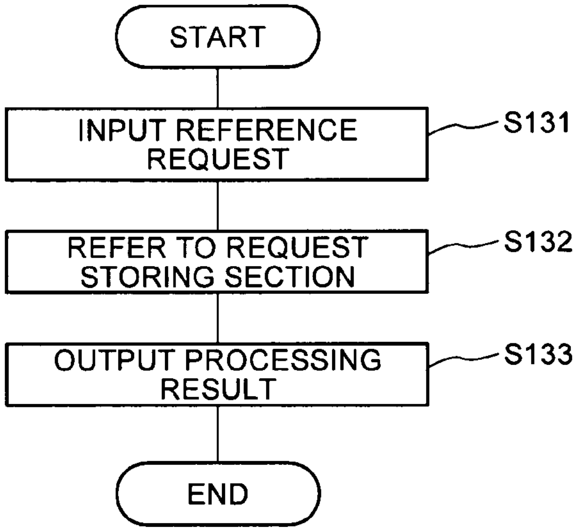
FIG. 5 is a flowchart showing an example of a referring process of a processing result of a processing request in the first exemplary embodiment of the invention.
Figure 6A:
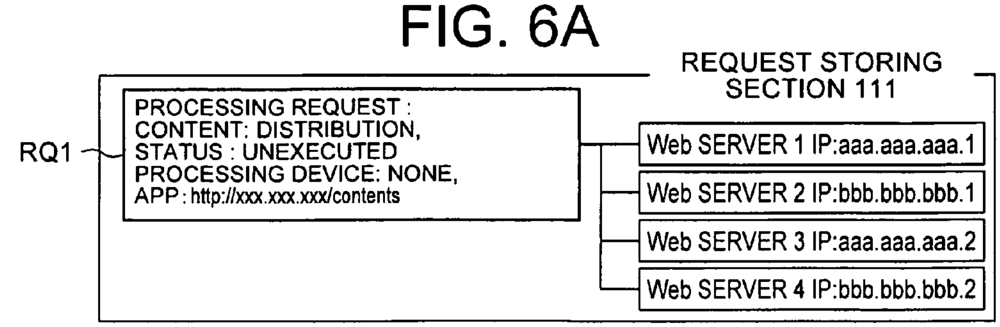
FIG. 6 (consisting of FIGS. 6A, 6B, 6C and 6D) is a diagram showing an example of state transition of a processing request stored in the request storing section in the first exemplary embodiment of the invention.
Figure 6B:
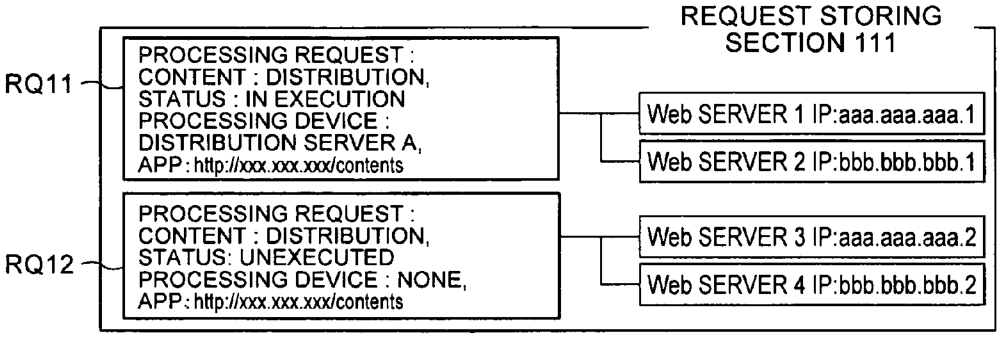
Figure 6C:
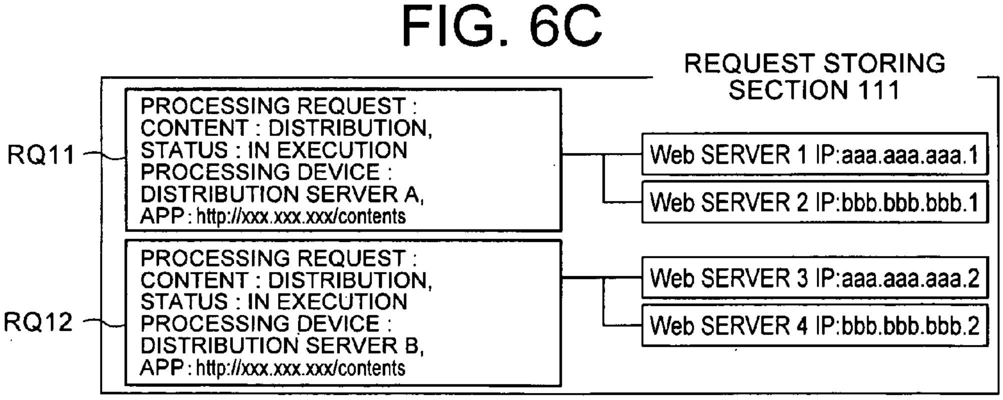
Figure 6D:
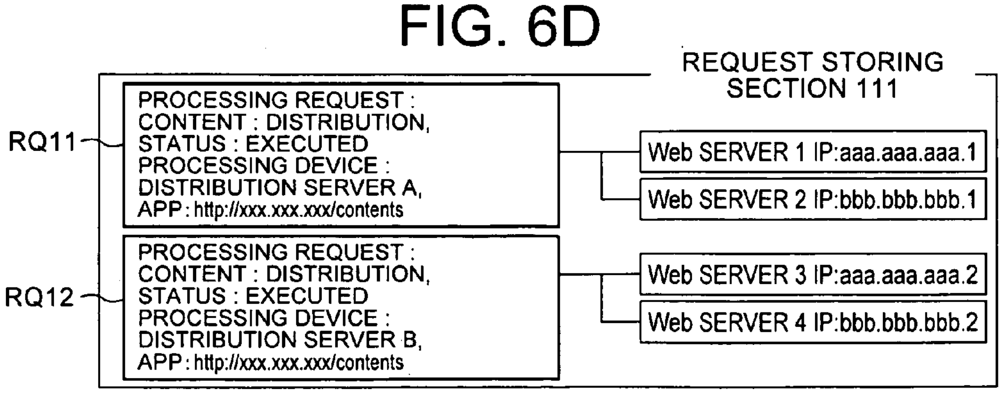
Figure 7:
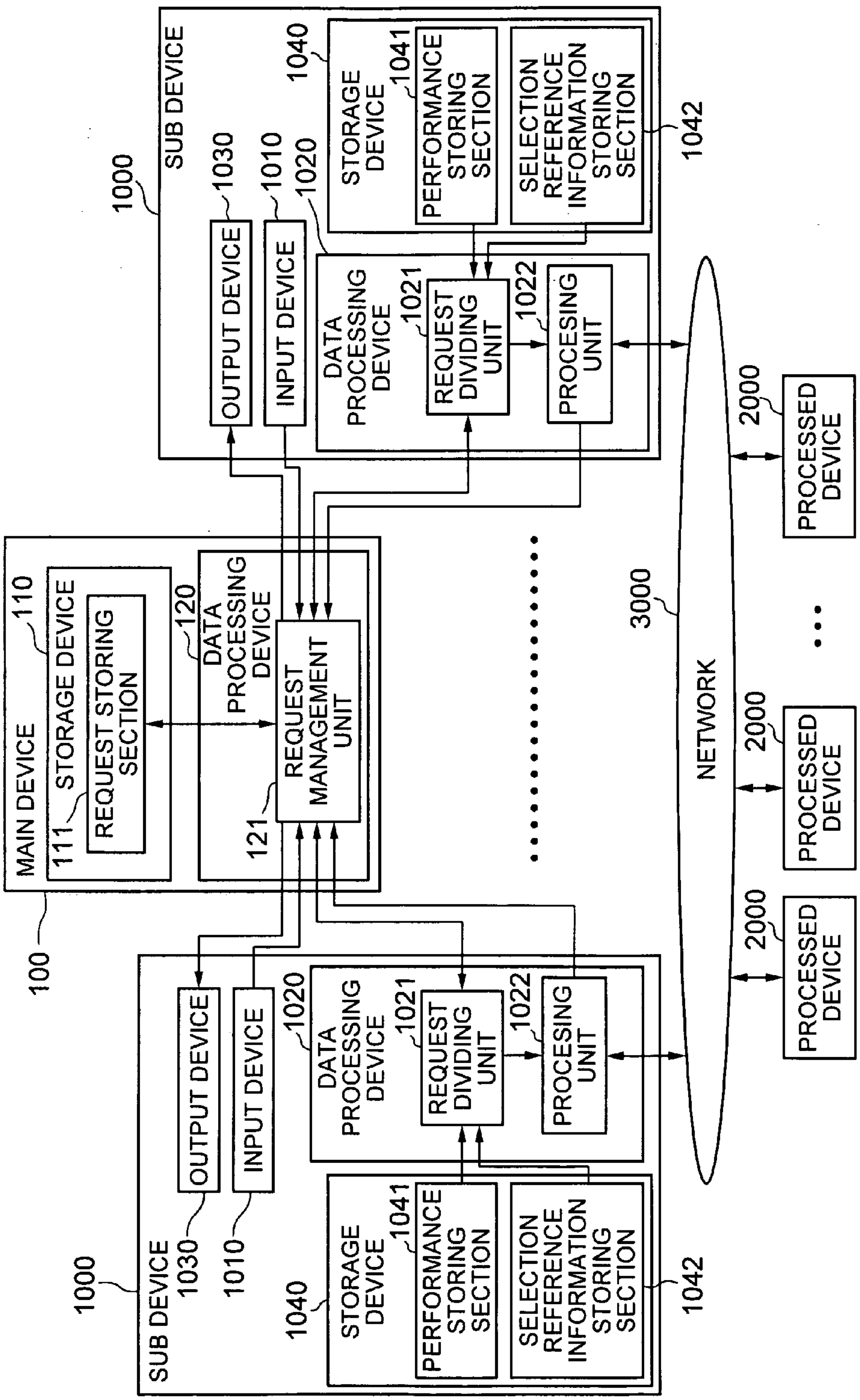
FIG. 7 is a block diagram showing a second exemplary embodiment of the invention.
Figure 8A:
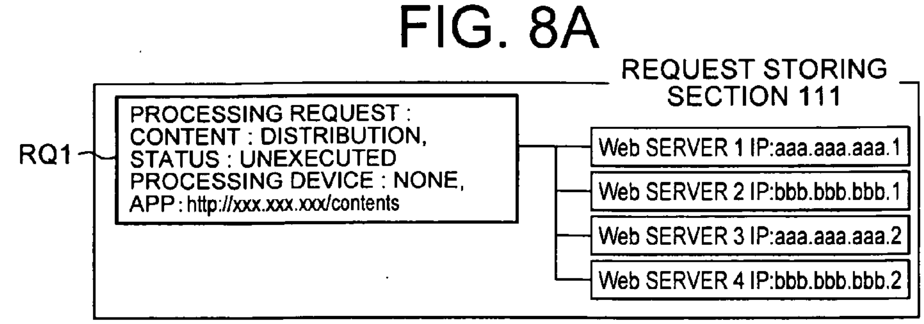
FIG. 8 (consisting of FIGS. 8A, 8B, 8C and 8D) is a diagram showing a state transition of a processing request stored in the request storing section in the second exemplary embodiment of the invention.
Figure 8B:
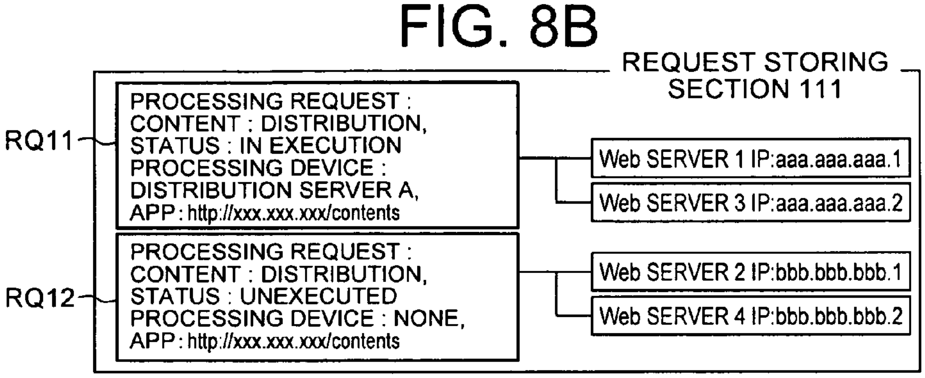
Figure 8C:
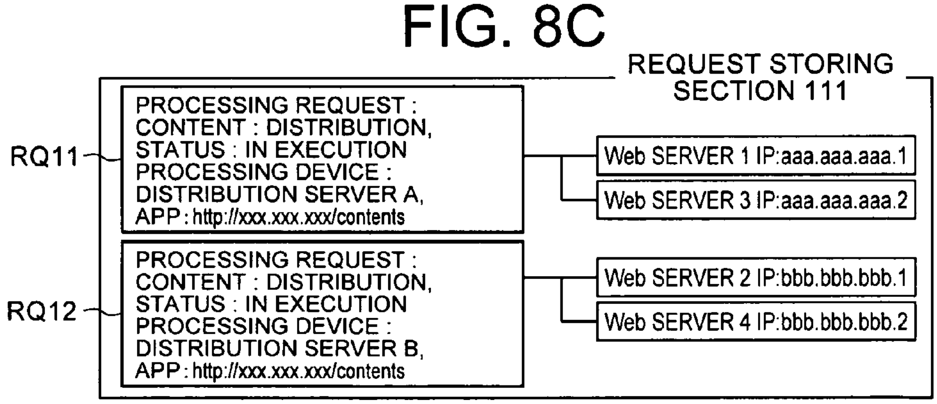
Figure 8D:
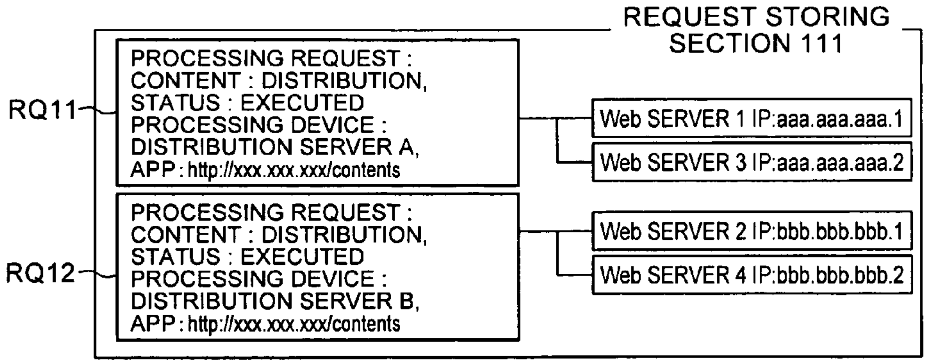
Figure 9:
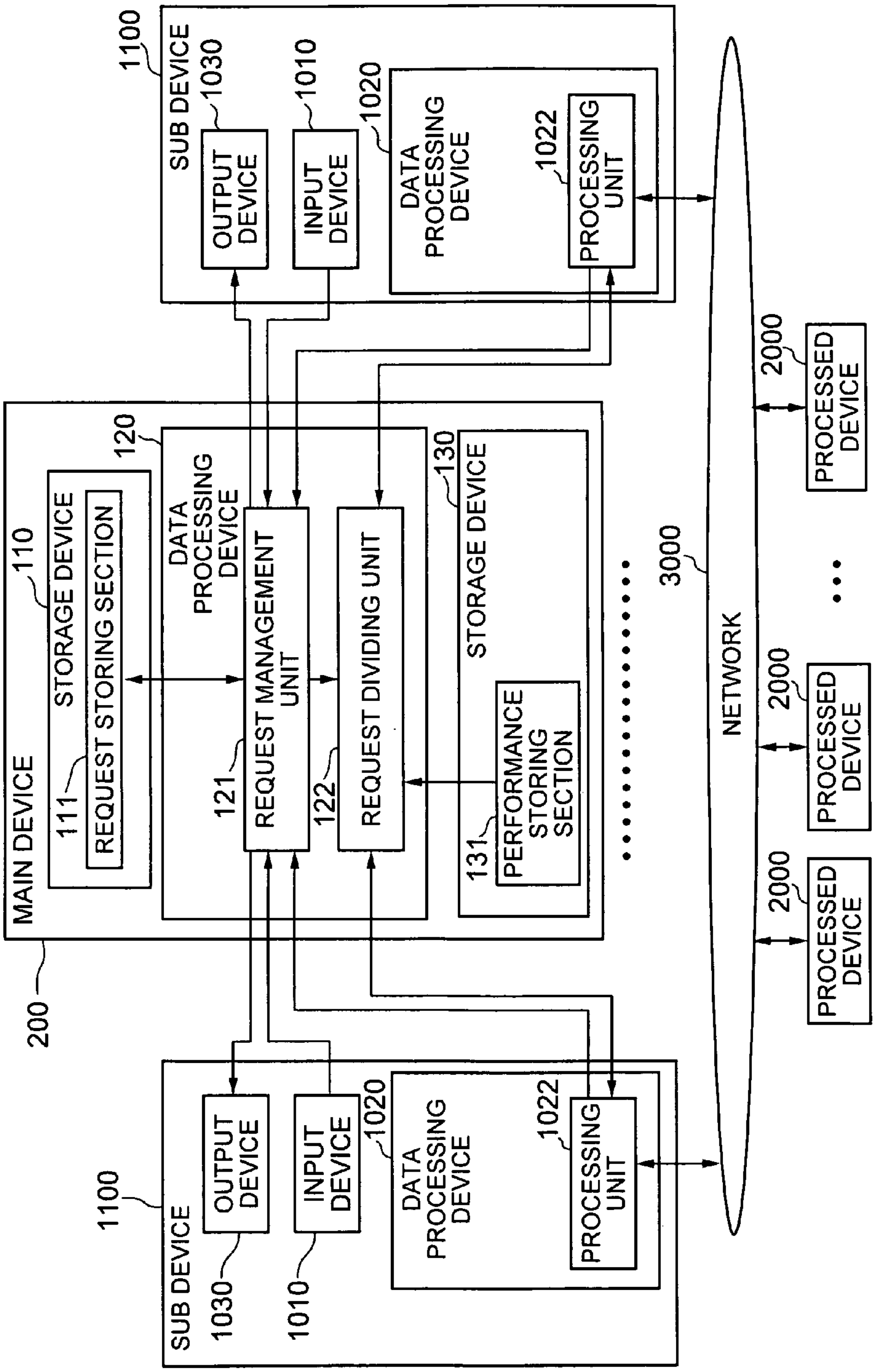
FIG. 9 is a block diagram showing a third exemplary embodiment of the invention.
Figure 10:
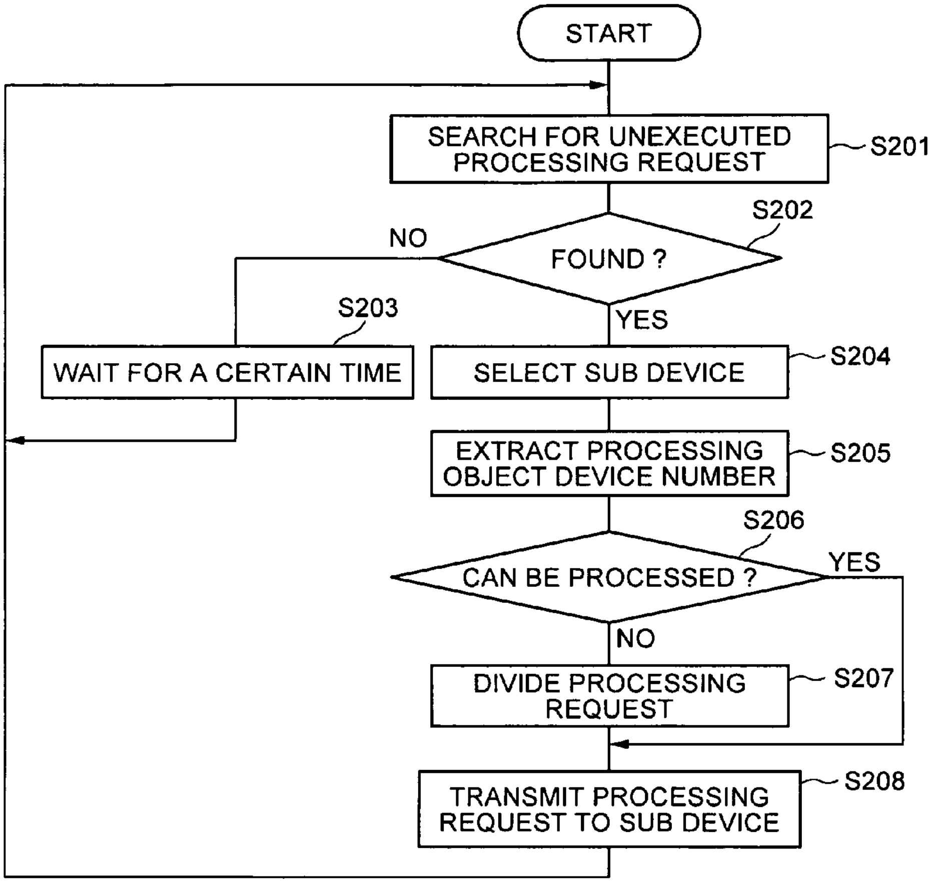
FIG. 10 is a flowchart showing exemplary processing of a request dividing unit of the main device in the third exemplary embodiment of the invention.
Figure 11:
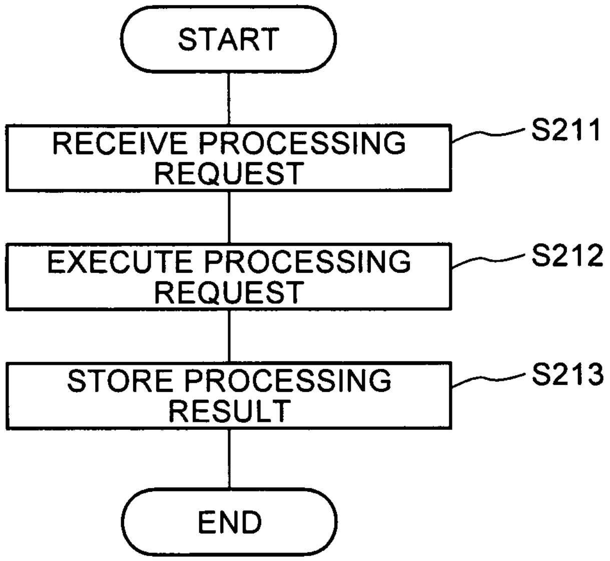
FIG. 11 is a flowchart showing exemplary processing of a request dividing unit of a sub device in the third exemplary embodiment of the invention.
Figure 12:
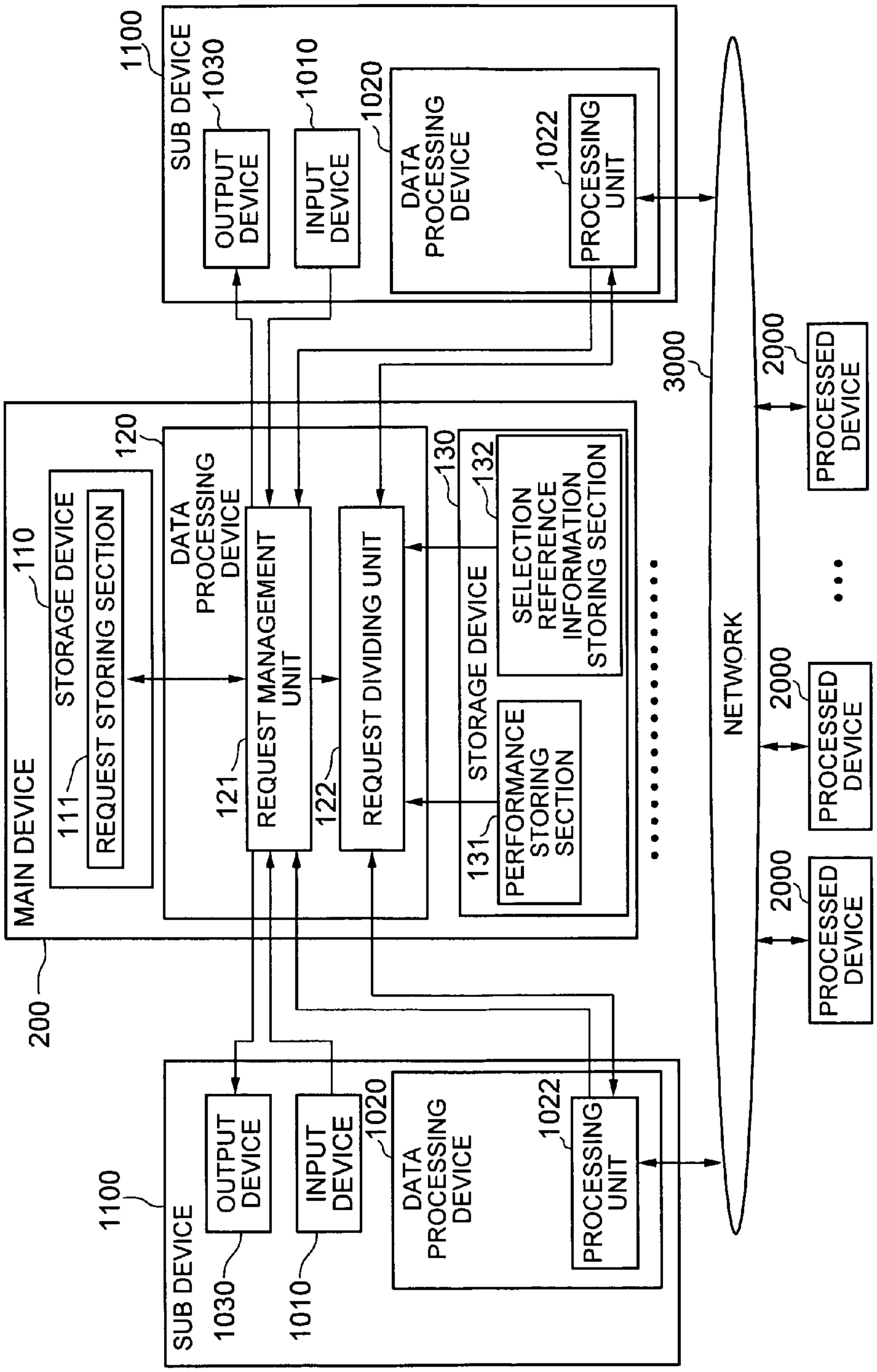
FIG. 12 is a block diagram showing a fourth exemplary embodiment of the invention.
Figure 13:
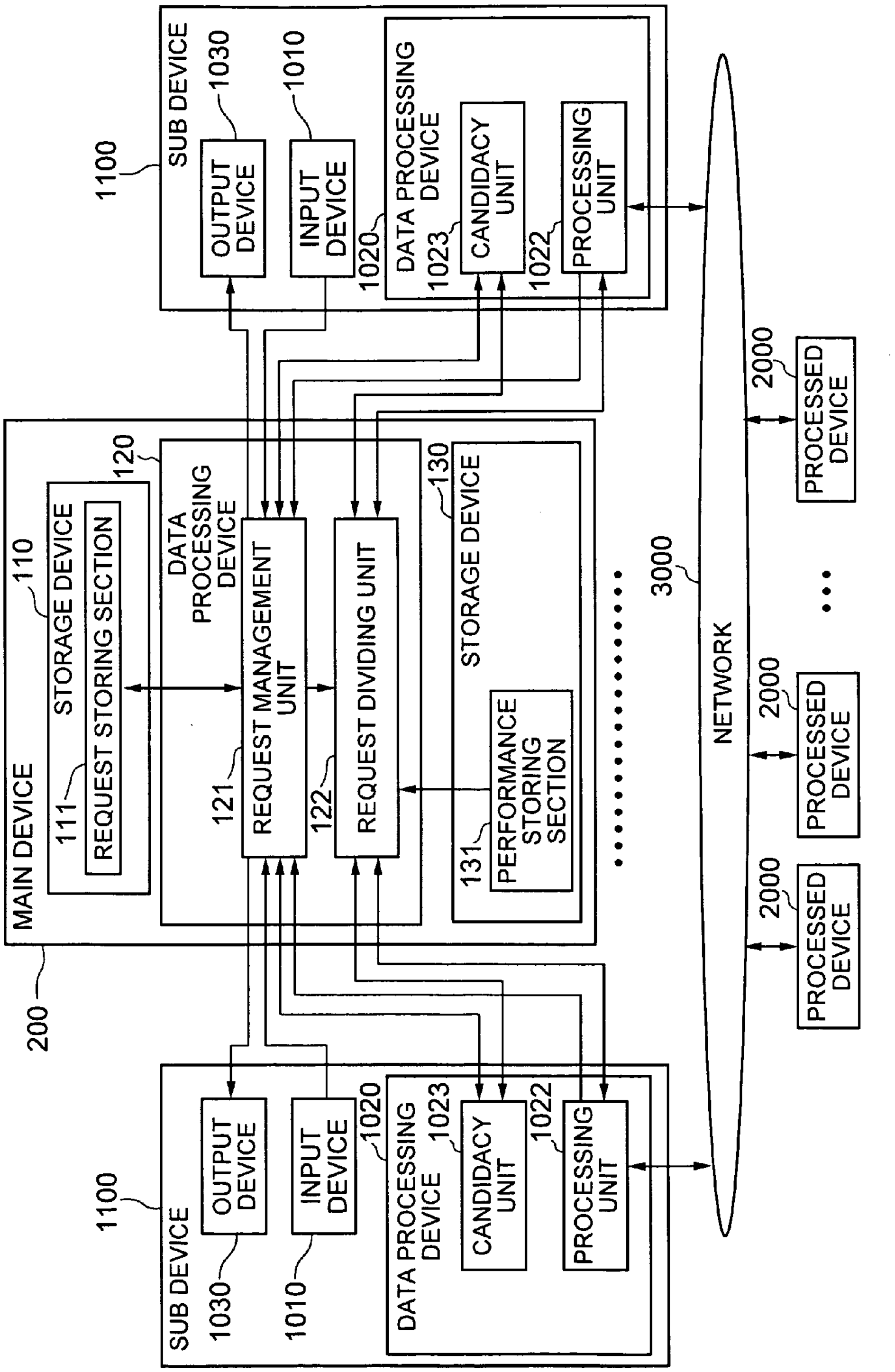
FIG. 13 is a block diagram showing a fifth exemplary embodiment of the invention.
Figure 14:
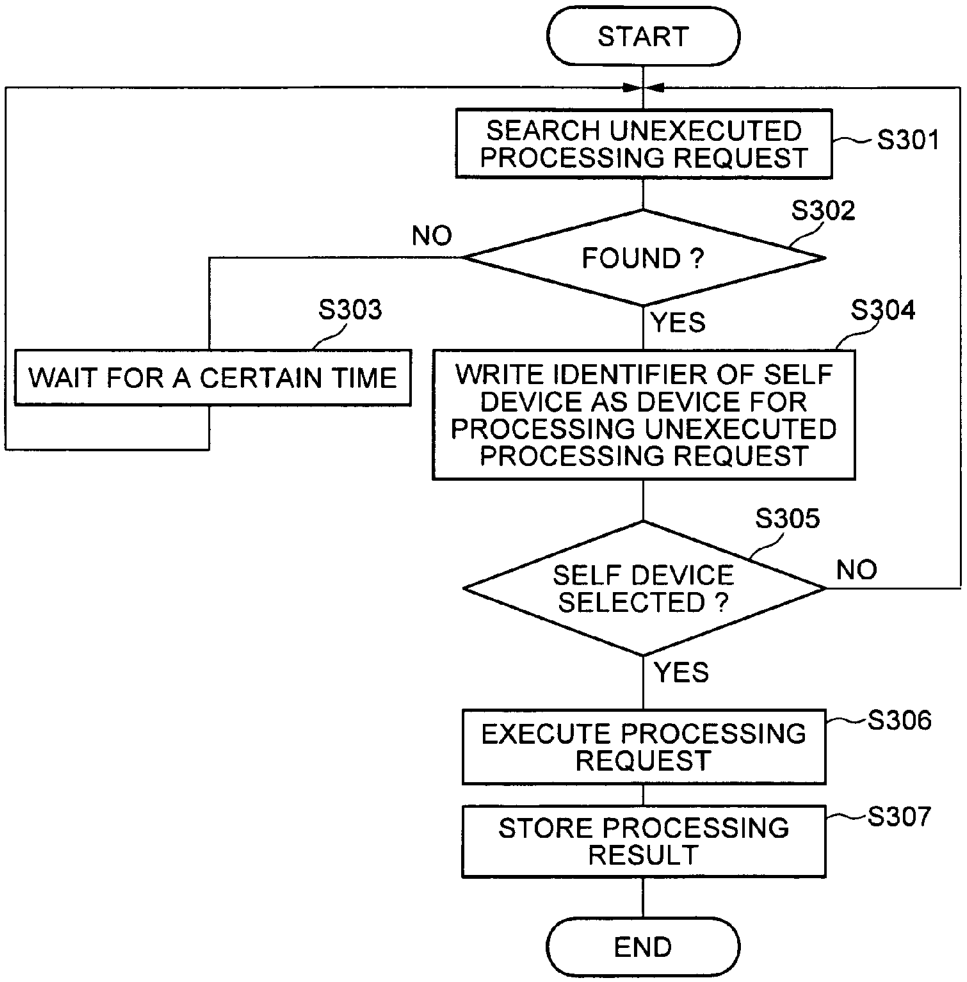
FIG. 14 is a flowchart showing exemplary processing of a data processing device of a sub device in the fifth exemplary embodiment of the invention.
Figure 15:
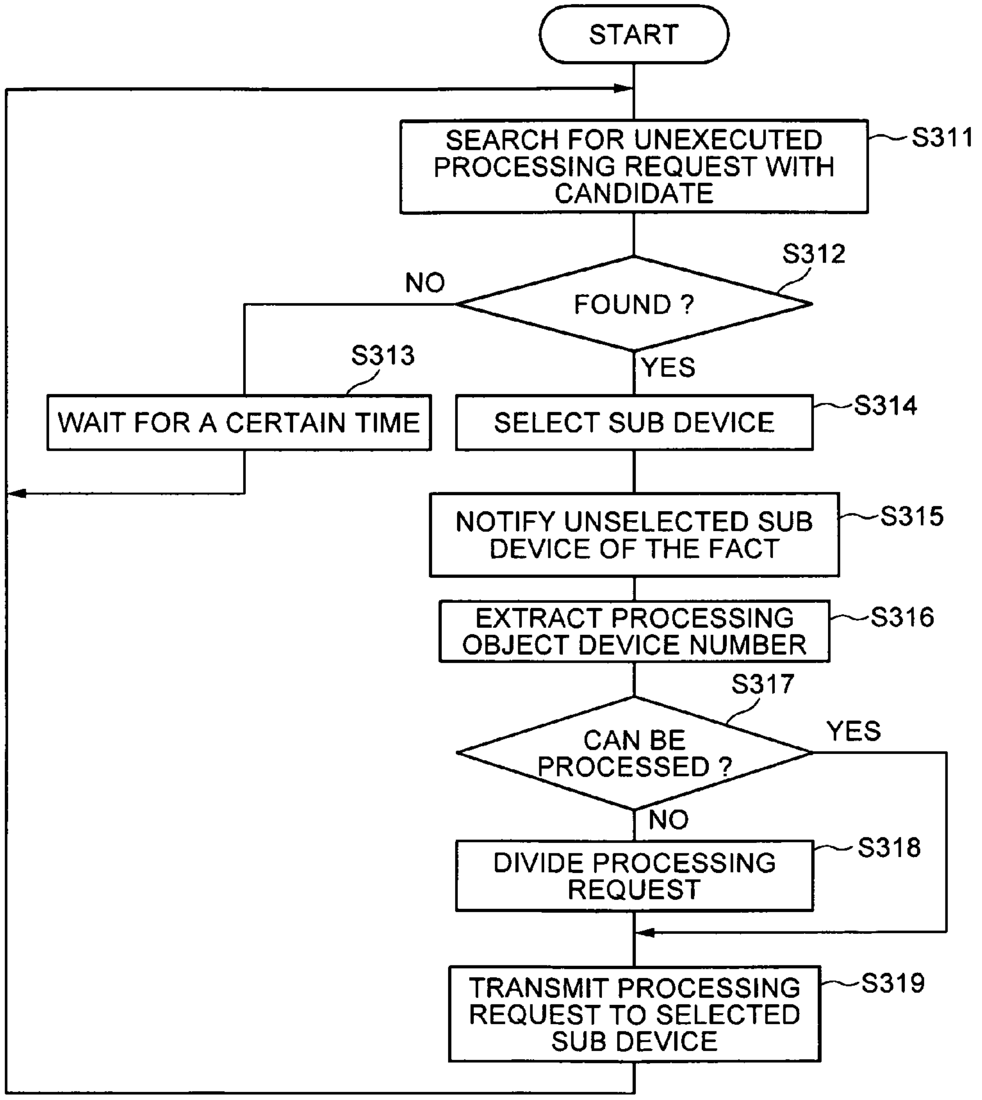
FIG. 15 is a flowchart showing exemplary processing of a request dividing unit of the main device in the fifth exemplary embodiment of the invention.
Figure 16A:
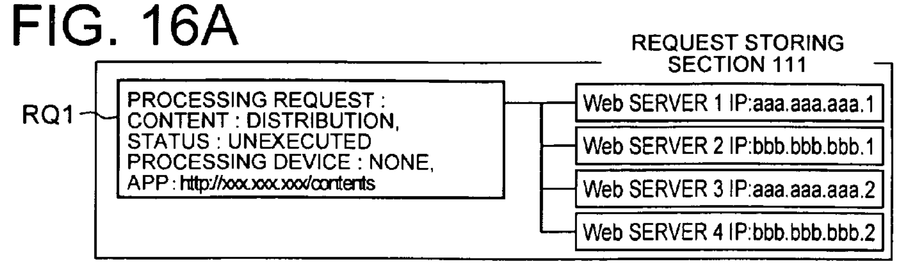
FIG. 16 (consisting of FIGS. 16A, 16B, 16C, 16D and 16E) is a diagram showing an example of state transition of a processing request stored in the request storing section in the fifth exemplary embodiment of the invention.
Figure 16B:
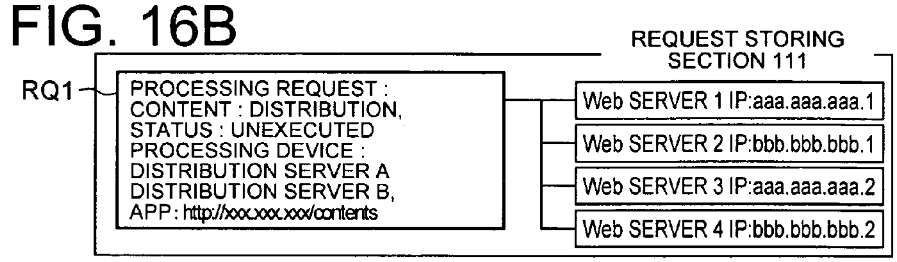
Figure 16C:
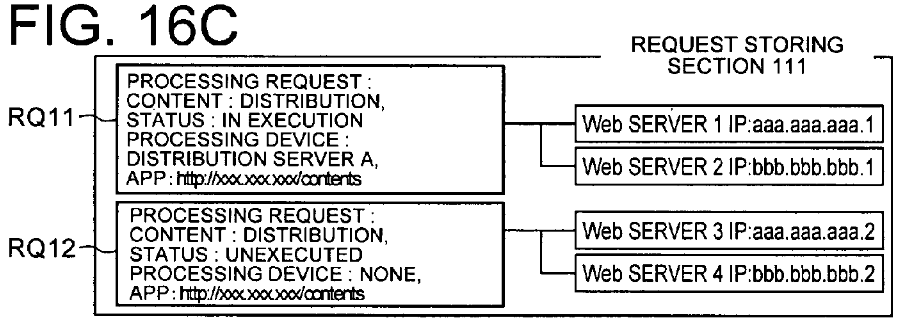
Figure 16D:
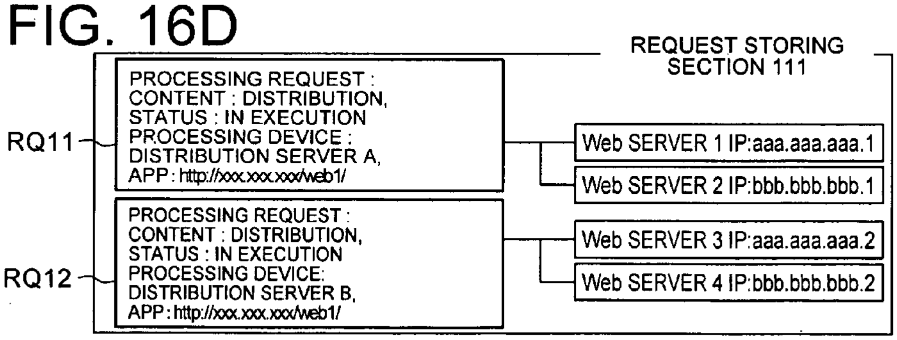
Figure 16E:
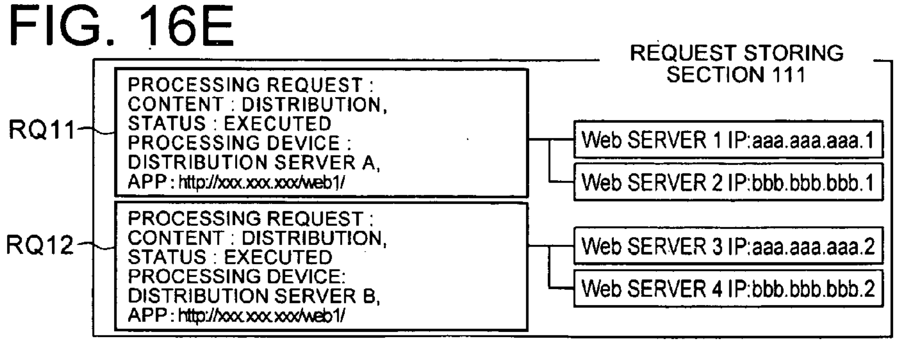
Figure 17:
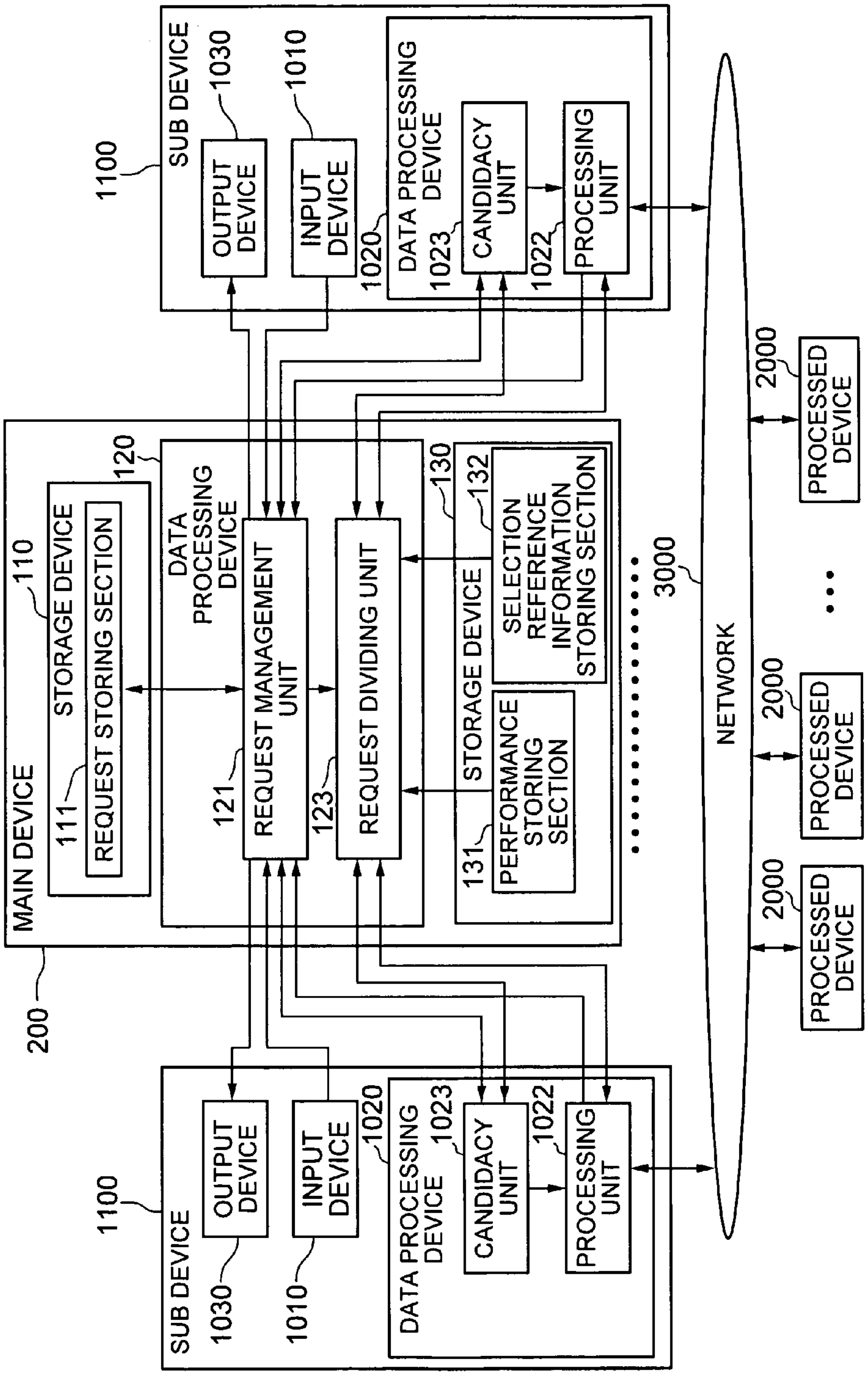
FIG. 17 is a block diagram showing a sixth exemplary embodiment of the invention.
Figure 18:
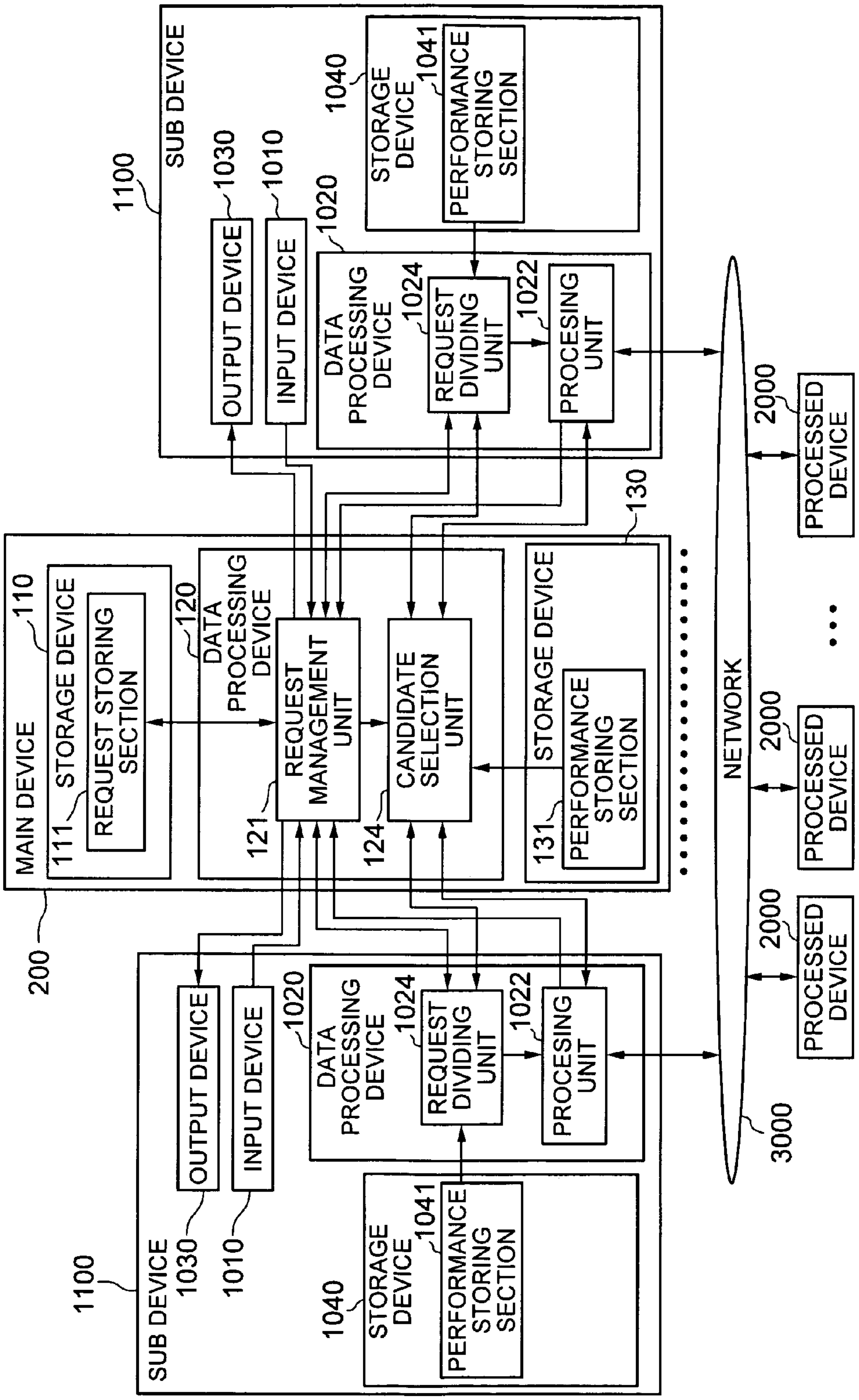
FIG. 18 is a block diagram showing a seventh exemplary embodiment of the invention.
Figure 19:
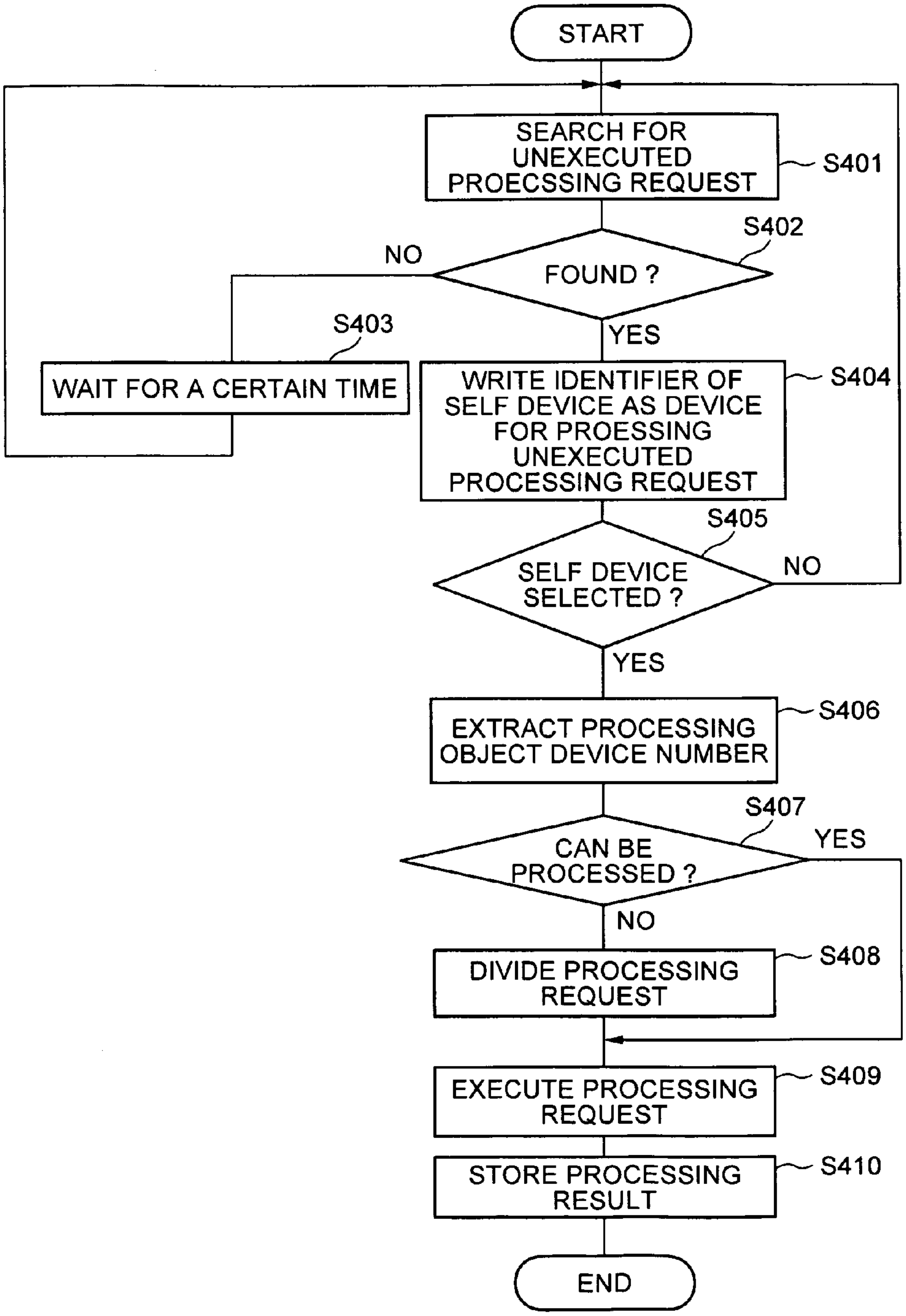
FIG. 19 is a flowchart showing exemplary processing of a data processing device of a sub device in the seventh exemplary embodiment of the invention.
Figure 20:
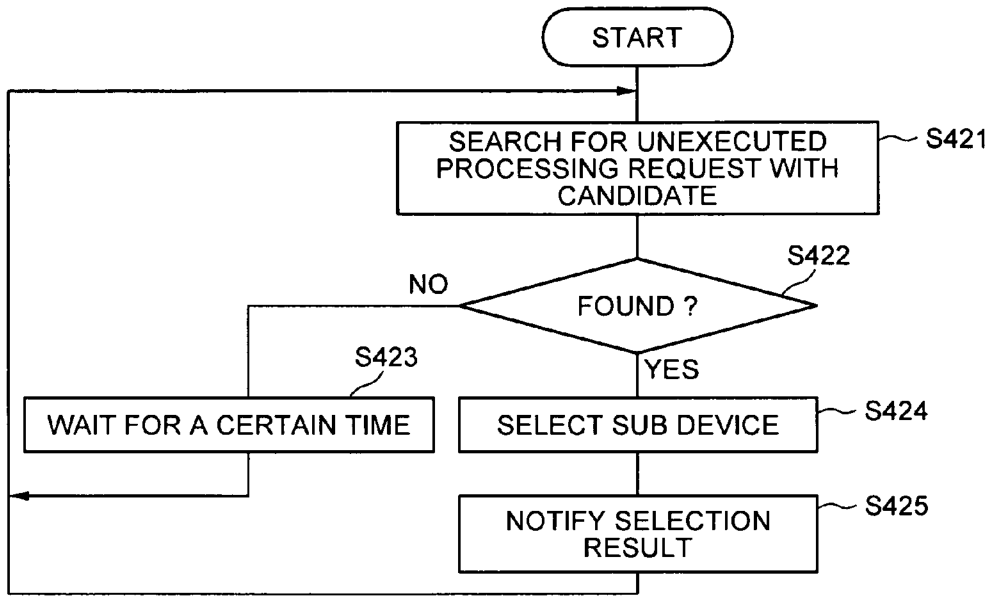
FIG. 20 is a flowchart showing exemplary processing of a candidate selection unit of the main device in the seventh exemplary embodiment of the invention.
Figure 21:
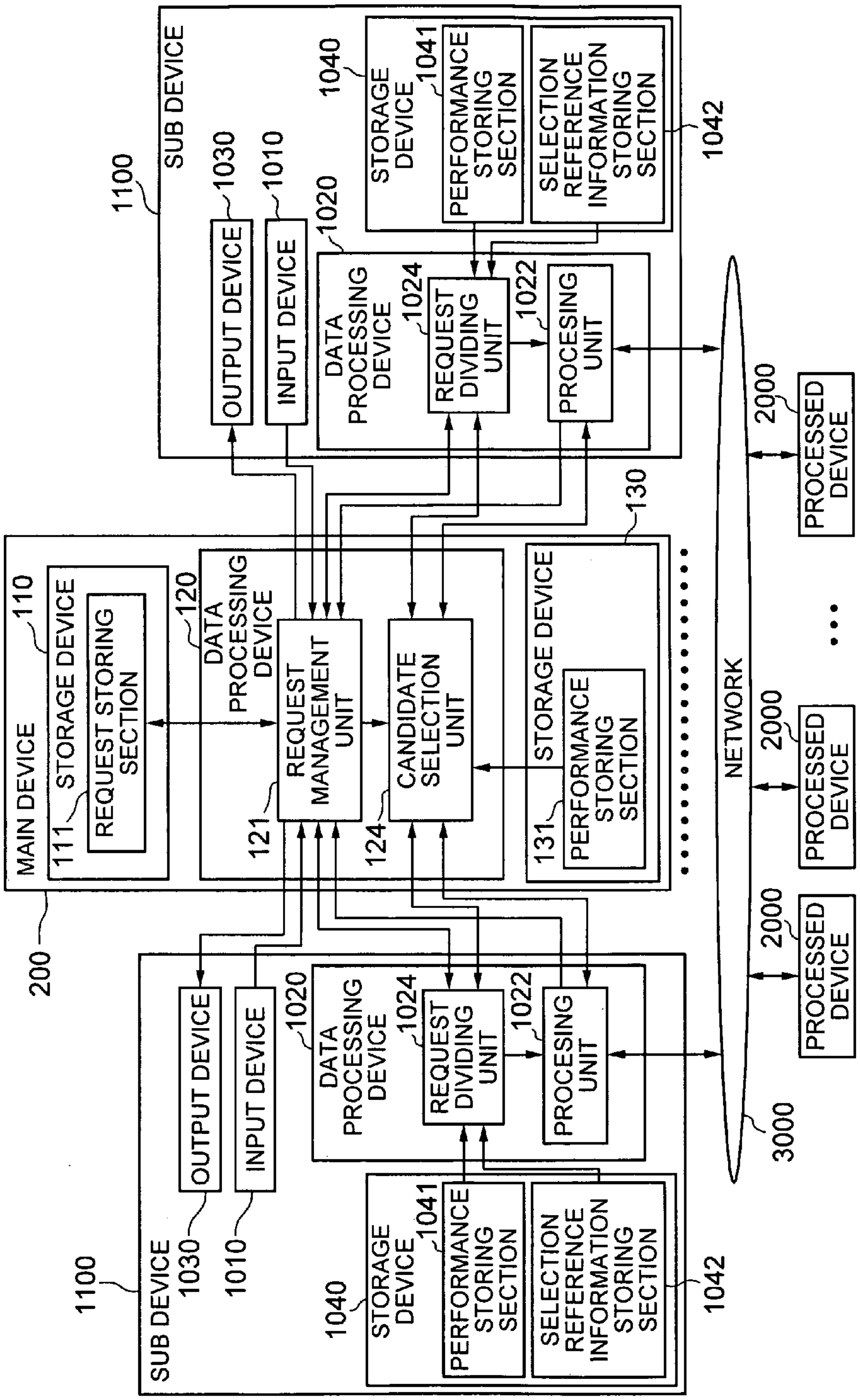
FIG. 21 is a block diagram of an eighth exemplary embodiment of the invention.

100, 200 main device
110 storage device

111 request storing section
120 data processing device
121 request management unit
122, 123 request dividing unit
124 candidate selection unit
130 storage device
131 performance storing section
132 selection reference information storing unit
1000 sub device
1010 input device
1020 data processing device
1021, 1024 request dividing unit
1022 processing unit
1023 candidacy unit
1030 output device
1040 storage device
1041 performance storing unit
1042 selection reference information storing unit
2000 processed device
3000 network

What is claimed is:

1. An information processing system comprising:

a request storing section which stores a processing request including description of a plurality of processed devices which are processing objects and description of processing content to be performed thereon;

a plurality of processing units which share and execute the processing request; and a plurality of request dividing units which take out an unexecuted processing request from the request storing section when performing the processing request, and divide the unexecuted processing request into a plurality of processing requests, one of which includes description of processed devices of a number commensurate with processing capacity of a processing unit and description of a processing content to be performed thereon, wherein the plurality of processing units are in one-to-one correspondence to the plurality of request dividing units, and from among the processing requests divided by a request dividing unit, a processing unit shares a number of processed devices that is described in the divided processing requests and commensurate with processing capacity of the processing unit, and executes the divided processing requests.

2. The information processing system, according to claim 1, comprising:

a plurality of sub devices; and a main device capable of communicating with the plurality of sub devices, wherein the main device includes the request storing section, and each of the sub devices includes a processing unit and a request dividing unit.

3. The information processing system, according to claim 2, wherein the request dividing unit of each of the sub devices periodically searches the request storing section of the main device and determines by itself a processing request to be processed by a self sub device.

4. The information processing system, according to claim 2, wherein the request dividing unit of each of the sub devices periodically searches the request storing section of the main device and writes an identifier of a self sub device into a processing request that the request dividing unit desires to process by the self sub device, and the main device includes a candidate selection unit which selects a sub device for processing a processing request stored in the request storing section from among sub devices that identifies thereof are written with respect to the processing request.

5. An information processing device comprising:

a plurality of processing units which are connected in a communicable manner with a main device having a request storing section which stores a processing request including description of a plurality of processed devices which are processing objects and description of a processing content to be performed thereon for executing the processing request; and a plurality of request dividing units which take out an unexecuted processing request from the request storing section when performing the processing request, and divide the unexecuted processing request into a plurality of processing requests, one of which includes description of processed devices of a number commensurate with processing capacity of a processing unit and description of a processing content to be performed thereon, wherein the plurality of processing units are in one-to-one correspondence to the plurality of request dividing units, and wherein, from among the processing requests divided by a request dividing unit, a processing unit shares a number of processed devices that is described in the divided processing requests and commensurate with processing capacity of the processing unit, and executes the divided processing requests.

6. The information processing device, according to claim 5, wherein each of the request dividing units of the plurality periodically searches the request storing section of the main device and determines by itself a processing request to be processed by a self sub device.

7. The information processing device, according to claim 5, wherein each of the request dividing units of the plurality periodically searches the request storing section of the main device, and writes an identifier of a self sub device into a processing request that the request dividing unit desires to process by the self sub device, and waits for the self sub device being selected by the main device as a device for executing the processing request.

8. The information processing device, according to claim 5, wherein each of the request dividing units of the plurality periodically searches the request storing section and determines a processing request to be processed and a sub device for processing the processing request.

9. The information processing device, according to claim 5, wherein each of the request dividing units of the plurality periodically searches the request storing section and determines a processing request to be processed, and also determines a sub device for processing the processing request from among sub devices that identifiers thereof are written with respect to the processing request.

10. A non-transitory computer readable recording medium storing a program which causes a computer to function as, the computer being connected in a communicable manner with a main device having a request storing section which stores a processing request including description of a plurality of processed devices which are processing objects and description of a processing content to be performed thereon, a plurality of processing units which share and execute a processing request, and a plurality of request dividing units which take out an unexecuted processing request from the request storing section when performing the processing request, and divide the unexecuted processing request into a plurality of processing requests, one of which includes description of processed devices of a number commensurate with processing capacity of a processing unit and description of a processing content to be performed thereon, and further causes the computer to function as a processing unit which, from among the processing requests divided by a request dividing unit, shares a number of processed devices described in the divided processing requests and commensurate with processing capacity of the processing unit, and executes the divided processing requests, wherein the plurality of processing units are in one-to-one correspondence to the plurality of request dividing units.

11. The non-transitory computer readable recording medium storing the program according to claim 10, which causes the computer to perform, by each of the request dividing units of the plurality, a function of periodically searching the request storing section of the main device and determining by itself a processing request to be processed by a self sub device.

12. The non-transitory computer readable recording medium storing the program according to claim 10, which causes the computer to perform, by each of the request dividing units of the plurality, a function of periodically searching the request storing section of the main device, and writing an identifier of a self sub device into a processing request that the request dividing unit desires to process by the self sub device, and waiting for the self sub device being selected by the main device as a device for executing the processing request.

13. A non-transitory computer readable recording medium storing a program for causing a computer, having a request storing section which is connected in a communicable manner with a plurality of sub devices having a plurality of processing units which share and execute a processing request, and stores a processing request including description of a plurality of processed devices which are processing objects and description of a processing content to be performed thereon, to function as a plurality of request dividing units provided to the plurality of processing units of the plurality of sub devices which take out an unexecuted processing request from the request storing section when performing a processing request, and divide the unexecuted processing request into a plurality of processing requests, one of which includes description of processed devices of a number commensurate with processing capacity of a processing unit and description of a processing content to be performed thereon, wherein the plurality of processing units are in one-to-one correspondence to the plurality of request dividing units.

14. The non-transitory computer readable recording medium storing the program according to claim 13, which causes the computer to perform, by each of the request dividing units of the plurality, a function of periodically searching the request storing section and determining a processing request to be processed and a sub device for processing the processing request.

15. The non-transitory computer readable recording medium storing the program according to claim 13, which causes the computer to perform, by each of the request dividing units of the plurality, a function of periodically searching the request storing section and determining a processing request to be processed, and also determining a sub device for processing the processing request from among sub devices that identifiers thereof are written with respect to the processing request.

16. An information processing device comprising:

a plurality of processing means which are connected in a communicable manner with a main device having a request storing section which stores a processing request including description of a plurality of processed devices which are processing objects and description of a processing content to be performed thereon for executing the processing request; and a plurality of request dividing means for taking out an unexecuted processing request from the request storing section when performing the processing request, and dividing the unexecuted processing request into a plurality of processing requests, one of which includes description of processed devices of a number commensurate with processing capacity of a processing means and description of a processing content to be performed thereon, wherein the plurality of processing means are in one-to-one correspondence to the plurality of request dividing means, and wherein, from among the processing requests divided by a request dividing means, a processing means shares a number of processed devices that is described in the divided processing requests and commensurate with processing capacity of the processing means, and executes the divided processing requests.

17. An information processing system comprising:

request storing means for storing a processing request including description of a plurality of processed devices which are processing objects and description of processing content to be performed thereon;

a plurality of processing means for sharing and executing the processing request; and a plurality of request dividing means for taking out an unexecuted processing request from the request storing section when performing the processing request, and dividing the unexecuted processing request into a plurality of processing requests, one of which includes description of processed devices of a number commensurate with processing capacity of a processing unit and description of a processing content to be performed thereon, wherein the plurality of processing means are in one-to-one correspondence to the plurality of request dividing means, and from among the processing requests divided by a request dividing means, a processing means shares a number of processed devices that is described in the divided processing requests and commensurate with processing capacity of the processing means, and executes the divided processing requests.

* * * * *

UNITED STATES PATENT AND TRADEMARK OFFICE

CERTIFICATE OF CORRECTION

PATENT NO. : 8,438,282 B2
APPLICATION NO. : 12/308275
DATED : May 7, 2013
INVENTOR(S) : Shinya Miyakawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 468 days.

Signed and Sealed this
Eighth Day of September, 2015

Michelle K. Lee
*Director of the United States Patent and Trademark Office*